United States Patent
Jarvis et al.

(10) Patent No.: US 10,947,837 B2
(45) Date of Patent: Mar. 16, 2021

(54) APPARATUSES AND METHODS FOR SENSING TEMPERATURE ALONG A WELLBORE USING TEMPERATURE SENSOR MODULES CONNECTED BY A MATRIX

(71) Applicant: METROL TECHNOLOGY LIMITED, Aberdeen (GB)

(72) Inventors: Leslie David Jarvis, Stonehaven (GB); Shaun Compton Ross, Aberdeen (GB)

(73) Assignee: Metrol Technology Limited, Aberdeen (GB)

( * ) Notice: Subject to any disclaimer, the term of this patent is extended or adjusted under 35 U.S.C. 154(b) by 79 days.

(21) Appl. No.: 16/303,202

(22) PCT Filed: May 26, 2017

(86) PCT No.: PCT/GB2017/051524
§ 371 (c)(1),
(2) Date: Nov. 20, 2018

(87) PCT Pub. No.: WO2017/203294
PCT Pub. Date: Nov. 30, 2017

(65) Prior Publication Data
US 2019/0203582 A1    Jul. 4, 2019

(30) Foreign Application Priority Data
May 26, 2016    (GB) ..................................... 1609293

(51) Int. Cl.
*E21B 47/07*    (2012.01)
*E21B 47/13*    (2012.01)
(Continued)

(52) U.S. Cl.
CPC .............. *E21B 47/07* (2020.05); *E21B 47/13* (2020.05); *G01K 1/026* (2013.01); *G01K 7/01* (2013.01);
(Continued)

(58) Field of Classification Search
CPC ........ E21B 47/07; E21B 47/13; E21B 47/017; E21B 17/003; E21B 43/116; E21B 43/24;
(Continued)

(56) References Cited

U.S. PATENT DOCUMENTS 2,619,180 A    11/1952    Smith et al.
3,020,961 A    2/1962    Orr
(Continued)

FOREIGN PATENT DOCUMENTS

CN    203531888    4/2014
CN    104062691    9/2014
(Continued)

OTHER PUBLICATIONS

EPO Examination Report for EP Application No. 17727356.2, dated Nov. 22, 2019.
(Continued)

*Primary Examiner* — Brad Harcourt
(74) *Attorney, Agent, or Firm* — Womble Bond Dickinson (US) LLP

(57) ABSTRACT

Apparatus (100) for use in sensing temperature along a wellbore, comprising: tubing (110) comprising a plurality of temperature sensor modules (120) provided at locations along the inside of the tubing, having electrical properties that vary with temperature; and an electrical network (115) comprising a plurality of wires and said plural temperature sensor modules, wherein the wires and plural temperature sensor modules are configured as a matrix by which the wires comprise a first group of wires and a second, different
(Continued)

group of wires and each wire of the first group is electrically connected to each wire of the second group once, by different temperature sensor modules, such that each temperature sensor module can be individually electrically connected by a pair of wires comprising a first wire from the first group and a second wire from the second group.

51 Claims, 6 Drawing Sheets

(51) Int. Cl.
*G01K 1/02* (2021.01)
*G01K 7/01* (2006.01)
*G01K 7/18* (2006.01)
*E21B 47/017* (2012.01)
*E21B 17/00* (2006.01)
*E21B 43/116* (2006.01)
*E21B 43/24* (2006.01)
*E21B 47/16* (2006.01)
*E21B 47/18* (2012.01)

(52) U.S. Cl.
CPC .............. *G01K 7/18* (2013.01); *E21B 17/003* (2013.01); *E21B 43/116* (2013.01); *E21B 43/24* (2013.01); *E21B 47/017* (2020.05); *E21B 47/16* (2013.01); *E21B 47/18* (2013.01)

(58) Field of Classification Search
CPC ......... E21B 47/16; E21B 47/18; G01K 1/026; G01K 7/01; G01K 7/18
See application file for complete search history.

(56) References Cited

U.S. PATENT DOCUMENTS

| | | | |
|---|---|---|---|
| 5,221,916 | A | 6/1993 | McQueen |
| 5,394,141 | A | 2/1995 | Soulier |
| 5,576,703 | A | 11/1996 | MacLeod et al. |
| 6,173,772 | B1 | 1/2001 | Vaynshteyn |
| 6,324,904 | B1 | 12/2001 | Ishikawa et al. |
| 6,357,525 | B1 | 3/2002 | Langseth et al. |
| 6,494,616 | B1 | 12/2002 | Tokhtuev et al. |
| 8,215,164 | B1 | 7/2012 | Hussain et al. |
| 9,840,908 | B2 | 12/2017 | Patel et al. |
| 2002/0020535 | A1 | 2/2002 | Johnson et al. |
| 2002/0066563 | A1 | 6/2002 | Langseth et al. |
| 2003/0056952 | A1 | 3/2003 | Stegemeier et al. |
| 2004/0104029 | A1 | 6/2004 | Martin |
| 2005/0077086 | A1 | 4/2005 | Vise |
| 2006/0225881 | A1 | 10/2006 | O'Shaughnessy et al. |
| 2007/0162235 | A1 | 7/2007 | Zhan et al. |
| 2007/0236215 | A1 | 10/2007 | Innes et al. |
| 2008/0066536 | A1 | 3/2008 | Goodwin et al. |
| 2008/0156482 | A1 | 7/2008 | Gubar et al. |
| 2009/0066535 | A1* | 3/2009 | Patel .................. E21B 43/14 340/853.2 |
| 2009/0229813 | A1 | 9/2009 | Brink et al. |
| 2011/0158050 | A1 | 6/2011 | Merino et al. |
| 2011/0174487 | A1 | 7/2011 | Burleson et al. |
| 2011/0303409 | A1 | 12/2011 | Harrigan et al. |
| 2012/0085540 | A1 | 4/2012 | Heijnen |
| 2013/0075109 | A1 | 3/2013 | Frisby et al. |
| 2013/0133883 | A1 | 5/2013 | Hill |
| 2013/0299165 | A1 | 11/2013 | Crow |
| 2014/0041873 | A1 | 2/2014 | Lovik |
| 2014/0311736 | A1 | 10/2014 | Pipchuk et al. |
| 2015/0159480 | A1 | 6/2015 | Kalyanaraman et al. |
| 2015/0177042 | A1* | 6/2015 | Song .................. G01F 1/662 73/861.04 |
| 2015/0233773 | A1 | 8/2015 | Sale et al. |
| 2015/0252667 | A1 | 9/2015 | Chronister |
| 2015/0292288 | A1 | 10/2015 | Kasperski et al. |
| 2015/0315895 | A1 | 11/2015 | Patel et al. |
| 2016/0123133 | A1 | 5/2016 | Leeflang et al. |

FOREIGN PATENT DOCUMENTS

| | | |
|---|---|---|
| CN | 107476822 | 12/2017 |
| DE | 102010014415 | 12/2010 |
| EP | 2192262 | 6/2010 |
| EP | 2886790 | 6/2015 |
| GB | 2522272 | 7/2015 |
| WO | 200301169 | 1/2003 |
| WO | 2003098176 | 11/2003 |
| WO | 20060082364 | 8/2006 |
| WO | 20070056121 | 5/2007 |
| WO | 2014022384 | 2/2014 |
| WO | 2014120988 | 8/2014 |
| WO | 20150099762 | 7/2015 |
| WO | 2017203285 | 11/2017 |
| WO | 2017203286 | 11/2017 |
| WO | 2017203287 | 11/2017 |
| WO | 2017203288 | 11/2017 |
| WO | 2017203290 | 11/2017 |
| WO | 2017203291 | 11/2017 |
| WO | 2017203292 | 11/2017 |
| WO | 2017203293 | 11/2017 |
| WO | 2017203295 | 11/2017 |
| WO | 2017203296 | 11/2017 |

OTHER PUBLICATIONS

GCC Examination Report for GC 2017-33463, dated Jun. 3, 2019.
UKIPO Combined Search and Examination Report for GB1609293. 4, dated Nov. 10, 2016.
UKIPO Combined Search and Examination Report for GB1609294. 2, dated Nov. 15, 2016.
UKIPO Combined Search and Examination Report for GB1609295. 9, dated Jul. 7, 2016.
UKIPO Examination Report for GB1609295.9, dated Dec. 3, 2018.
UKIPO Combined Search and Examination Report for GB1609291.8 dated Nov. 4, 2016.
Schlumberger, WellWatcher, Permanent Downhole Reservoir and Production Monitoring, 2008.
Schlumberger, WellWatcher Flux, Digital temperature array and PT gauge system, 2014.
International Search Report for PCT/GB2017/051524, dated Jun. 27, 2017.
Schlumberger: "WellWatcher Flux, Multizonal reservoir monitoring system", 2016.
Copending International Application No. PCT/GB2017/051515 filed May 26, 2017.
Copending International Application No. PCT/GB2017/051516 filed May 26, 2017.
Copending International Application No. PCT/GB2017/051517 filed May 26, 2017.
Copending International Application No. PCT/GB2017/051518 filed May 26, 2017.
Copending International Application No. PCT/GB2017/051520 filed May 26, 2017.
Copending International Application No. PCT/GB2017/051521 filed May 26, 2017.
Copending International Application No. PCT/GB2017/051522 filed May 26, 2017.
Copending International Application No. PCT/GB2017/051523 filed May 26, 2017.
Copending International Application No. PCT/GB2017/051525 filed May 26, 2017.
Copending International Application No. PCT/GB2017/051526 filed May 26, 2017.
EAPO Office Action for Eurasian Application No. 201892753, dated Mar. 12, 2020.
EPO Summons to Attend Oral Proceedings on Corresponding European Application No. 17727356.2, dated Apr. 20, 2020.

(56) References Cited

OTHER PUBLICATIONS

Anonymous, Silicon bandgap temperature sensor, From Wikipedia, the free encyclopedia, May 1, 2016.

* cited by examiner

APPARATUSES AND METHODS FOR SENSING TEMPERATURE ALONG A WELLBORE USING TEMPERATURE SENSOR MODULES CONNECTED BY A MATRIX

CROSS REFERENCE TO RELATED APPLICATIONS

This application is a 35 U.S.C. 371 National Stage of International Application No. PCT/GB2017/051524, titled "APPARATUSES AND METHODS FOR SENSING TEMPERATURE ALONG A WELLBORE USING TEMPERATURE SENSOR MODULES CONNECTED BY A MATRIX", filed May 26, 2017, which claims priority to GB Application No. 1609293.4, titled "APPARATUSES AND METHODS FOR SENSING TEMPERATURE ALONG A WELLBORE USING TEMPERATURE SENSOR MODULES CONNECTED BY A MATRIX", filed May 26, 2016, all of which are incorporated by reference herein in their entirety.

FIELD OF THE TECHNOLOGY

The invention relates generally to sensing temperature along a wellbore. More particularly, the invention relates to methods and apparatuses for sensing temperature along a wellbore using temperature sensor modules connected by a matrix, and to a well incorporating said apparatuses, and to methods of calibrating said apparatuses.

BACKGROUND

Wells are drilled for a variety of purposes commonly relating to hydrocarbon exploration or extraction. Various well logging tools and methods may be used to gain data from wells during the drilling, testing, completion, production, suspension and abandonment stages of a well. This data can be used for a number of reasons, such as to optimise production from the reservoir or to design further wells in the same reservoir. The development of a model for the well and the flow rate from the formations opening into the well can greatly facilitate the targeted exploitation of the reservoir.

It is particularly important to exploration and extraction to collect data relating to the volumetric flow rate and pressure from various formations inside the well. Current tools and methods for logging volumetric flow rate and pressure can be costly and complicated, whereas it would be preferable to collect accurate, high-resolution data with as few technical and procedural constraints and requirements as possible.

Collecting temperature monitoring data along a wellbore can be useful in determining the type and flow rate of fluids entering a well. For example, oil entering a well at a given location generally has a warming effect, whereas water entering a well has an even greater warming effect. On the other hand, gas typically has a cooling effect, as do the heavy fluids that are typically used to balance and kill wells at the end of their lives. Generally, these warming and cooling effects are exaggerated where the flow rate of those fluids is greater.

Currently, the most commonly used tool for accurately sensing a temperature along a wellbore is a fibre-optic based distributed temperature sensor (DTS) system. These systems typically rely on information contained in the backscattered light from locations along the length of a fibre running along a wellbore, such as the frequency, time of flight, and intensity thereof, to infer a local temperature variation of the fibre due to the local environment that has caused the backscattering. DTS systems can provide a continuous temperature profile along the length of the fibre down to a spatial resolution of around 1 metre with a high level sensitivity and accuracy. However, the interrogator unit that generates and couples light into the fibre optics and that senses and analyses the backscattered light to generate the temperature data typically has to be provided at the surface of the well, generally coupled through the Christmas tree. Thus, the length of the fibre-optic that has to be run into the well can be considerable. For example, where a well test is being run on a short, 100 m section of well at a depth of 4000 m (as a measured depth from a rotary table of a drill rig, MDRT), a length of fibre-optic of greater than 4 km is necessary to test only 100 m of the well. Further, as packers or other annular seals against the wellbore surface are usually used to isolate sections of the well under test, for example during Drill Stem Testing (DST), the fibre-optic cabling is required to penetrate through or extend across the packer which can significantly complicate the design of the DTS system, the packer, and significantly add to the cost of the test.

An alternative to the prior art DTS systems that has been introduced to the market by Schlumberger is the WellWatcher Flux™ digital temperature array (http://www.slb-.com/~/media/Files/completions/product_sheets/well-watcher/wellwatcher_flux_ps.pdf). In this system, instead of using fibre optics, arrays of miniaturised, hermetically sealed, resistive temperature sensors are provided at intervals along the length of a ¼ inch (6.35 mm) diameter tubing. The tubing is again connected through the Christmas tree at the well head and control electronics provided at each temperature sensor array provide a digital readout of the sensed temperature data at the arrays via an RS-485 connection. While the arrays of temperature sensors are provided in a ¼ inch (6.35 mm) diameter tubing, the temperature sensors produce larger diameter sections of the tubing, having an outer diameter of at least 17 mm for at least 400 mm in length.

In such digital temperature arrays having this type of construction and operation, the larger sections containing the temperature sensors and control electronics are welded to the tubing, which means that the process for manufacturing the digital temperature array of this can be complicated requiring a number of different components and steps to be constructed separately and joined together. The provision of a significant amount of complicated control electronics is required in each enlarged section of the tubing to try to achieve autonomous sensors that have a desired accuracy, which can lead to the sensor modules being bulky and does not lend itself to miniaturisation or ruggedisation of the sensor modules for reliable operation in hazardous environments downhole, particularly in open hole configurations. The use of individual digital sensor modules is prone to drift, not only of the sensor, but also of the individual measurement and reference electronics, and can lead to undesirable drift of the temperature data from sensor modules relative to one another. Further, as the tubing has extended sections with a larger outer diameter, these render the digital temperature array complicated and difficult to manufacture, install and use and relatively fragile in the well. Due to the extended sections, with larger outer diameters, the array is also difficult to install in small spaces and difficult to seal against. For example, installing the digital temperature arrays of this type across packers can be particularly difficult.

The inventors note that platinum resistance sensors are frequently used where high levels of accuracy are required for temperature measurement, but further note that in such sensors it is particularly difficult to combine robustness to shock with high levels of repeatability, accuracy and low drift.

It is in this context that the present invention has been devised.

SUMMARY OF THE INVENTION

Viewed from one aspect, the present invention provides apparatus for use in sensing temperature along a wellbore, comprising: tubing comprising a plurality of temperature sensor modules provided at locations along the inside of the tubing, having electrical properties that vary with temperature; and an electrical network comprising a plurality of wires and said plural temperature sensor modules, wherein the wires and plural temperature sensor modules are configured as a matrix by which the wires comprise a first group of wires and a second, different group of wires and each wire of the first group is electrically connected to each wire of the second group once, by different temperature sensor modules, such that each temperature sensor module can be individually electrically connected by a pair of wires comprising a first wire from the first group and a second wire from the second group.

By using a matrix arrangement for connecting the temperature sensor modules, a large number of temperature sensors to be coupled by and uniquely addressed or measured using the wires of the matrix. This is particularly useful for achieving a high number of temperature sensor measurements, enabling a high spatial resolution or sensitivity over a long length of the tubing, where a limited number of wires are provided in the tubing. For example, for a typical 19 wire core, up to 90 temperature sensors can be coupled and measurements taken by connecting combinations of wire pairs. In addition, the use of a matrix allows the achievement of a simple analogue addressing of the constituent temperature sensors (by switching appropriate pairs of wires) and a response signal indicative of a sensed temperature to be received on the wires connecting the temperature sensors using only simple electronic components at the temperature sensor modules themselves and at a control module coupled to the electrical network and configured to receive and process an electrical signal associated with the temperature sensor modules. As a result, apparatus for use in sensing temperature along a wellbore having a matrix switching arrangement can be made rugged and robust enough to reliably operate in the hazardous environment of a wellbore and even to withstand pressure shockwaves, for example from the ignition of guns to create perforations in the well. Further, the robust apparatus can be made cost effectively and using small, simple components that can fit inside the tubing, giving the tubing a smooth outer profile facilitating the manufacture of the apparatus and its installation in a well.

In embodiments, not all of the wires provided in the tubing are connected as a matrix. For example, 19 wires may be provided but fewer than 90 temperature sensor modules may be connected between the wires in the tubing, such that not all of the wires of in the tubing form a fully meshed or connected matrix. However, a subset of the wires will form such a matrix.

In embodiments, the temperature sensor modules comprise temperature sensors provided at least in part by at least one semiconductor element having electrical properties that vary with temperature. In embodiments, the temperature sensors are configured as silicon bandgap temperature sensors each having two p-n junctions that, in use, are operated a different current densities to infer a temperature by determining a voltage difference between the two p-n junctions at the different current densities, which is proportional to absolute temperature. In other embodiments, wherein the semiconductor elements are diodes. In embodiments, the diodes are constant current diodes or constant voltage diodes.

In embodiments, at least one, or each temperature sensor module comprises a single electronic component. That is, the functional components of the temperature sensor module that provide the sensitivity are in embodiments provided by only a single electronic component, however the temperature sensor modules may also comprise other, non-electronic components, such as packaging and electrical interconnects, that do not contribute functionally to the temperature sensitivity. In embodiments, at least one, or each temperature sensor module comprises a single passive electronic component. In these embodiments, the single electronic component is the semiconductor element, such as the diode that provides the temperature sensitivity. The temperature sensor module may include other non-electronic components, such as electrical components providing interconnects, and packaging for the module. Using a single electronic component to provide the temperature sensitivity of the temperature sensitive components of the apparatus facilitates the installation of the temperature sensitive modules in a small outer diameter tubing (as low as 3-14 mm tubing) while also allowing the outer diameter of the tubing to remain smooth and relatively constant at locations along the whole or at least part of the length of the temperature sensor modules and at locations in the tubing away from the temperature sensor modules. The installation of the single electronic component temperature sensor modules in the small outer diameter tubing also makes the manufacture of the apparatus cheaper and relatively easy to process and manufacture (no larger diameter components need to be manufactured and welded to the tubing), and also to install.

In embodiments, the maximum physical extent of the single electronic component in any axis is less than 7 mm, preferably less than 5 mm, more preferably less than 4 mm, even more preferably less than 3 mm. The use of e.g. single semiconductor temperature sensors enables the use of very small temperature sensitive components, allowing the temperature sensor modules to also be small. This allows the modules to be easily embedded in the tubing in a space-efficient manner. In embodiments, the single electronic component has a very low mass (excluding extraneous packaging and interconnects), optionally less than 1 g, optionally less than 500 mg, optionally less than 250 mg, optionally less than 150 mg, optionally less than 50 mg, Providing the temperature sensor module comprising a single, low mass, electronic component to provide the temperature sensitivity provides a very robust apparatus as the low mass of the components results in them being able to withstand higher acceleration, for example, from the ignition of guns to create perforations. Also, the structural integrity of the small, low mass components is relatively high. Thus the apparatus can be provided across, along, and or around perforating guns and can withstand their ignition and reliably continue to operate to provide temperature sensor data after ignition of the charges.

In embodiments, the apparatus is configured to use only the temperature sensitivity of the or each temperature sensitive semiconductor element of each temperature sensor module to infer a temperature of the temperature sensor module. In this sense, in these embodiments, no other components need to be provided to contribute to the sensing of temperature and the semiconductor elements are used to sense temperature directly.

In particularly advantageous embodiments, the apparatus comprises temperature sensor modules that are provided substantially by a single electronic component in the form of a diode (although other non-electronic components may be provided, such as packaging and interconnect) that are embedded inside the tubing and connect the wire matrix and provide the temperature sensitivity of the tubing at their sensing location.

In embodiments, the semiconductor elements are constant current diodes (also known as current limiting diodes) or, alternatively, conventional ("constant voltage") diodes such as small signal or Schottky diodes. In embodiments where conventional diodes are used, a voltage drop across the diode is kept relatively constant independent of small variations in current. However, the voltage drop across these diodes is dependent on temperature (e.g. a typical silicon diode has a temperature coefficient of around 2 mV/K). Therefore, if they are supplied with a constant current, the voltage measured across them varies with and so can be used to measure the temperature of the diode, which will be indicative of the environment surrounding the tubing at the location of the temperature sensor. Alternatively, constant current diodes may be used, which, when supplied with a relatively constant voltage, permit a flow of current that varies with temperature. It is this usually undesirable effect that enables them to be used as temperature sensors by measuring the current flowing therethrough. Here, the voltage drop due to the resistivity of the wires can be compensated for using the method as described below.

Semiconductor diodes have been found to have a sufficiently suitable temperature sensitivity to be usable to provide an indication of a thermal characteristic (which may be a temperature characteristic such as relative temperature (monitoring changes) or absolute temperature at a location local to the temperature sensor) in the tubing. Diodes are readily available components that are small, and so can be easily fitted inside small diameter tubing, robust, so they can withstand pressure shockwaves and temperature cycling, and are repeatable and reliable in their performance. The use of semiconductor temperature sensors allows a robust apparatus for measuring temperature in a wellbore to be provided that can withstand pressure shockwaves induced, for example, by the ignition of shaped charges when firing perforation guns. Thus the apparatus can be mounted across, along, and or around perforating guns and run into the well along with the perforating gun, giving valuable temperature measurements revealing information about fluid flow characteristics and gun effectiveness after perforations have been created thereby. In addition, the use of semiconductor temperature sensors permits small sensor modules to be embedded inside small diameter tubing, allowing the tubing to be created to have a small diameter and also a smooth outer profile, without any bulges, so as to facilitate installation of the apparatus in a restricted annular space around the perforating gun, and across or beneath annular seals in the wellbore.

In embodiments, the temperature sensor modules each further comprise a resistance thermometer, such as a resistance temperature device or thermistor, optionally a platinum resistance thermometer, wherein the apparatus is configured such that the temperature sensitivity of each resistance thermometer is used to infer a thermal characteristic (which may be a temperature characteristic such as relative temperature (monitoring changes) or absolute temperature at a location local to the temperature sensor) of the environment to which the tubing is exposed at the location of that temperature sensor.

In embodiments, the temperature sensors each further comprise a crystal oscillator, each crystal oscillator having an electrical oscillation frequency that varies with temperature. In embodiments, the crystal oscillators are quartz crystals.

In embodiments, the temperature sensor modules each comprise a diode arranged to block current from flowing back through the temperature sensor modules in the matrix. In embodiments, the blocking diode is a low reverse current leakage diode, optionally having a reverse current leakage of less than 50 nA at the operational voltage of the apparatus and at a temperature of 25 degrees Celsius. Where the temperature sensor modules comprise temperature sensors provided at least in part by at least one semiconductor element having electrical properties that vary with temperature, in embodiments the low reverse current leakage diode provides the temperature sensitivity of each temperature sensor module. The use of low reverse current leakage diodes can be advantageous to prevent unwanted current flows when measuring the temperature at individual temperature sensor modules, particularly where the temperature sensor modules are connected by an electrical network arranged as a matrix as described herein.

In embodiments, the tubing comprises a matrix of at least 10 wires, preferably at least 15 wires, more preferably at least 18 wires, and in particular 19 wires. In embodiments, the tubing comprises 6 temperature sensor modules along its length, preferably at least 16 modules, more preferably at least 19 modules, still more preferably at least 30 modules, still more preferably at least 60 modules, and still more preferably at least 80 modules. The use of temperature sensor modules arranged in a matrix arrangement accordance with present invention facilitates the provision of large numbers of temperature sensor modules within and along a length of tubing, which may be served by a single or multiple control module or control sub-modules. This can provide sensitivity and a very high spatial resolution, or enable sensing over a very long distance.

In embodiments, the apparatus further comprises communication means within the tubing to enable data communication along the tubing, for instance additional wire(s) may be provided to enable communication between control modules, or to enable communication with other devices within the well.

In embodiments, the apparatus further comprises a control module electrically connected to multiple temperature sensor modules, via the electrical network, and configured to, in use, periodically switch through combinations of pairs of wires to electrically connect and infer a temperature at each of the temperature sensors. In embodiments, the control module comprises one or more relays arranged to, in use, switch through the combinations of pairs of wires, wherein the relays are optionally electromechanical relays or a semiconductor switches. In this way, the control module can automatically switch through and take measurements from the temperature sensors connected using the matrix.

In embodiments, the control module is configured to infer a thermal characteristic (which may be a temperature characteristic such as relative temperature (monitoring changes) or absolute temperature at a location local to the temperature sensor) of each temperature sensor module based on the known sensitivity of the current in or voltage across the temperature sensor to variations in temperature and by measuring variations in the current in and/or voltage across the temperature sensor over time.

In embodiments, the temperature sensors are configured to, in use, encode and transmit a digital signal to the control module indicative of the temperature-sensitive electrical property of the temperature sensor, and wherein the control module is configured to, in use, determine a sensed temperature at each temperature sensor using said received digital signals. In embodiments, a plurality of, and optionally all, temperature sensor modules are configured to transmit digital signals to the control module using the same wire. In embodiments, the control module is configured to measure the digital signals associated with the temperature sensor modules to enable inference of the temperature of the semiconductor elements and the environment to which the tubing is exposed at the location of that semiconductor element. Digital encoding of a locally sensed electrical characteristic of the semiconductor temperature-sensitive element allows a simple, reliable and effective means of capturing and conveying the temperature information from the temperature sensor modules to the control module without the sensed temperature information being affected by, e.g. the temperature sensitivity of the resistance of the wires. Thus the effects of the wires in the matrix do not need to be calibrated for if the temperature sensor modules encode and transmit digital signals representative of the sensed temperature to the control module. Thus the sensitivity of the apparatus to noise and errors is then low.

In embodiments, the control module is configured to measure an analogue current and/or voltage associated with the temperature sensor modules to enable inference of the temperature of the temperature sensor modules and the environment to which the tubing is exposed at the location of that temperature sensor modules. The analogue sensing of an electrical characteristic of the circuit including the temperature sensor modules at the control module, e.g. addressing the temperature sensor modules using a matrix, provides an elegant and effective means of temperature measurement, and also allows the temperature sensor modules to have a simple construction, avoiding the need for any local digital components, and is particularly suited to be used along with a common reference at the control module.

In embodiments, the apparatus further comprises calibration means configured to compensate for the resistance of wires in the electrical network that connect the temperature sensor modules to the control module, and preferably also for the temperature dependence of the resistivity of those wires, wherein optionally the calibration means is provided as part of the control module. In embodiments, the calibration means is configured to achieve this resistance compensation by having, prior to use, measured the resistance of the wiring to each sensor at least 2 known temperatures to determine the resistance and temperature coefficient of the individual sensor wiring. These resistance and temperature coefficients of the individual sensor wiring are stored as calibration data in the calibration means. In use, the calibration means is configured to use the prior calibration data and the known temperature of segments of the wire to calculate the resistance of the wiring to a sensor at a point in time. Thus, in cases where a voltage applied to the temperature sensors is affected by the voltage drop over the wires and where this would affect the accuracy of the temperature measurements, the provision of the aforementioned calibrating means can compensate for the resistance of the wires and for the resultant voltage drops. This enables the control electronics to be provided distant from the temperature sensor modules, which allows the size of the temperature sensor modules to be kept small, allowing the temperature sensor modules to be provided inside a small diameter tubing while maintaining a smooth, bulge-free outer profile of the tubing. In embodiments, components of the above calibration means may be provided at the surface or configured such that certain operations, such as processing of data, may be carried out on the data at surface by components of the calibration means or other data processing means working together with the calibration means.

In embodiments, the control module further comprises a common reference signal generator used as a reference for the measurement of the voltage and/or current of at least two or each of temperature sensor modules. In embodiments, the common reference signal generator is a reference voltage source. Providing a common reference signal at the control module for comparing the signal received from the temperature sensor modules (as opposed to providing multiple reference signal generators local to each temperature sensor module, where the reference signal would be subject to local variations due to, e.g., temperature differences, and drift) provides high inter-sensor accuracy and stability, with low drift. It also enables the relative changes of temperature between sensors to be detected more readily. In the downhole environment, particularly at elevated temperatures, drift of the reference and measurement circuit can frequently have a greater impact on temperature reading accuracy over time than drift of the sensor itself, provision of a common reference and measurement circuit eliminates the effect of this drift on inter-sensor accuracy.

Where the temperature sensor modules comprise crystal oscillators, in embodiments the common reference signal generator is a reference oscillating electrical signal generated at the control module by a reference crystal oscillator common to a plurality of, optionally all, the temperature sensors. In embodiments, the apparatus is configured to, in use, determine a temperature variation at each crystal oscillator temperature sensor by comparing a signal derived from the crystal oscillator temperature sensor with a signal derived from the reference crystal oscillator. Optionally, the temperature sensor modules are configured to send a pulse to the control module, the pulse length being determined by time for x oscillations of sensor and pulse length measured using reference oscillator. The reverse method can also be used, with pulse being sent based on the reference.

In embodiments, the tubing is filled with and encapsulates a non-conducting liquid, optionally an oil, and optionally wherein the tubing comprises a pressure balancing means, optionally including a bellows or flexible bladder, configured to act to equalise internal pressure in the tubing with the ambient environment. In embodiments, the temperature sensor modules in the tubing are encased in a potting compound. Providing the temperature sensor modules in liquid-filled and optionally pressure-balanced tubing and/or encased in potting compound, such as an epoxy or thermosset plastics or silicone rubber, increases the protection, e.g., against mechanical shock and pressure shockwaves and, for semiconductor temperature sensor components, can help withstand pressure shockwaves caused by the ignition of shaped charges by guns, e.g. to form perforations during well testing.

In embodiments, the tubing is metallic, preferably, one of a stainless steel, a duplex or super-duplex stainless steel, a nickel alloy, titanium or a titanium alloy.

In embodiments, the tubing outer diameter is in the range of 3 mm to 14 mm, optionally in the range of 6 mm to 10 mm, at the location in the tubing of at least one of the temperature sensor modules, preferably at least 50%, more preferably at least 90%, and particularly 100% of the temperature sensor modules. Thus it should be clear in these embodiments that the invention is directed to the provision of apparatus for measuring temperature downhole in a small diameter tubing.

In embodiments, the outer diameter of the tubing is the same at locations in the tubing of at least one or all of the temperature sensor modules and at locations in the tubing away from the at least one or all of the temperature sensor modules. In embodiments, the outer diameter of the tubing is not increased at locations in the tubing of at least one of the temperature sensor modules, preferably at least 50%, more preferably at least 90%, and particularly 100% of the temperature sensor modules. By "at the location" we mean locations of the tubing over the length or of part of the length of the temperature sensor module. In embodiments, the external profile of the tubing is not changed at the location in the tubing of at least one of the temperature sensor modules, preferably at least 50%, more preferably at least 90%, and particularly 100% of the temperature sensor modules. In embodiments, the outer diameter of the tubing remains substantially constant along the tubing. By this we mean that, the outer diameter of the tubing neither increases nor decreases along the length of the tubing due to the presence or absence of temperature sensor modules. Of course, this does not exclude the outer diameter increasing due to some other component provided in the tubing. In embodiments, the temperature sensor modules are configured to provide a smooth profile of the outer diameter of the tubing along the tubing. By providing a smooth profile, the tubing and apparatus can be more easily installed in the well. In accordance with these embodiments, lumps and changes in the shape and outer dimensions in the tubing due to the provision of the temperature sensor modules can be avoided. This facilitates installation of the temperature sensing apparatus in a well, and allows the apparatus to be easily deployed in more restricted spaces and sealed against, which facilitates installation across packers. The smooth outer diameter tubing even allows the temperature sensor array to be clamped across guns provided to create perforations in the well and casing once ignited. The smooth outer diameter tubing array is achievable by using semiconductor elements as the temperature sensor, which can be small in size, and by the provision of a majority of the control electronics in a control module at a location away from the temperature sensor modules in the tubing. This allows the temperature sensor array to be manufactured more easily, efficiently and cost effectively, and results in a shortened manufacturing lead time for the customer.

In embodiments, multiple control modules are provided, wherein individual control modules control sets of temperature sensor modules, and the control modules are linked to one or more master control modules.

In embodiments, the temperature sensor modules are spaced in the tubing at a spacing distance in the range 0.05 to 100 metres, more preferably 0.25 to 10 metres, and/or wherein the length of tubing containing the temperature sensor modules is between 0.25 to 10000 metres, more preferably 1 to 1000 metres, more preferably 10 to 200 metres. The provision of a number of temperature sensor modules in the tubing allows a spacing to be selected to give an appropriate, and appropriately high or low spatial resolution.

In embodiments, the tubing containing the temperature sensor modules is arranged as a ring or helix to extend around a tubular element of a well apparatus. In accordance with this embodiment, temperature sensitivity dependent on the azimuthal angle around the tubular element (e.g. the drill, test or production, casing or liner string) can be provided, which can provide an indication of, e.g., an in-flow direction of product into a well bore or casing. Arranging such an apparatus around a gun can, after firing (where the apparatus is sufficiently robust to withstand the shock), provide information about the successful firing of the guns and creation of well perforations.

In embodiments, the apparatus further comprises a power source configured to provide operational power to the apparatus for sensing temperature in the wellbore in use, wherein the power source is arranged to be provided as an in-well power source in use. In embodiments, the power source comprises one or more primary cells, secondary cells and/or downhole power generators. In embodiments, the power source may be replaceable in the well, for example the battery or power generator may be replaced using wireline, or coiled tubing.

In embodiments, the apparatus is configured to be powered in use from a position higher in the well, optionally from surface, and optionally via inductive or capacitive coupling. In embodiments, the apparatus further comprises a wireless data communication module coupled to the apparatus for use in sensing temperature in a wellbore and arranged to, in use, wirelessly transmit along the well signals indicative of a temperature sensed in the wellbore by the apparatus, optionally using relays or repeaters. The wireless communication module may be coupled to the apparatus wirelessly, by a separate wireless connection, or electrically by a wired connection and optionally also physically. In embodiments, the wireless data communication module is configured to transmit said signals acoustically and/or electromagnetically. In accordance with these embodiments, the apparatus for sensing a temperature can be provided as an autonomous system downhole, in which cabling for providing power and/or communication capabilities does not need to be provided. By providing a local power source and wireless communication capabilities, the apparatus for temperature sensing can be easily installed downhole in deep wells without having to run kilometres of cabling to the surface, through sealing elements, etc. By enabling data capture and recovery without having to recover the hardware, there is the option to discard the apparatus downhole after use. Alternatively, or in addition, the apparatus may be configured to store and/or transmit sensor data. The storing of the sensor data may only be for a short period such as up to 1 second or 1 minute, 1 hour or 1 day, for example for the purposes of buffering, or alternatively or in addition, the storing of the sensor data may be for longer periods such as at least a day, at least a month at least a year, at least 2 years, or at least 5 years, for the purposes of long term data storage and subsequent recovery wirelessly, or partial recovery, by a wired connection or by physical retrieval.

In embodiments, the apparatus wireless data communication module is further arranged to receive control signals for controlling the operation of the apparatus. Alternatively, the apparatus may comprise further a wireless receiver, or transceiver arranged to receive control signals. The wireless receiver or transceiver may be provided as part of the wireless communication module described above, or as a wireless control signal receiver/transceiver module which may be provided in the apparatus separately from the above-described wireless control module. The operation of the apparatus may be controlled by the received signals. Control may include, control of data acquisition, data transmission, and/or to control heating or cooling of the sensors (as described in more detail below).

Viewed from another aspect, the present invention provides a well comprising a well apparatus having apparatus for use in sensing temperature in a wellbore as described in accordance with the above aspect and embodiments of the invention, the apparatus being arranged to sense a temperature in a wellbore of the well. In embodiments, the well apparatus comprises a tubular element and an annular sealing device provided at least 100 m below a surface of the well, and between the wellbore or a casing of the wellbore and a tubular. The annular sealing device is a device which seals between two tubulars (or a tubular and the wellbore), such as a polished bore and seal assembly or a packer element. The seal assembly may be associated with a polished bore sub in a casing or liner. The packer element may be part of a packer, bridge plug, or liner hanger, especially a packer or bridge plug. The annular sealing device be arranged, e.g., to seal the flow of fluid between a well casing and a test or production string. In this respect, the temperature sensing apparatus may be used in the production zone of the well below the surface proximal to a formation for sensing temperature variations due to, e.g. the flow of product and other fluids, rather than being used near the well-head to sense temperature there for another purpose.

In embodiments, the apparatus for use in sensing temperature in a wellbore is provided entirely below the annular sealing device. In embodiments, the tubing of the apparatus for use in sensing temperature in a wellbore does not extend across the annular sealing device. In embodiments, the tubing of the apparatus for use in sensing temperature in a wellbore is provided below and extending across the annular sealing device, and wherein a control module of the apparatus for use in sensing temperature is provided in the wellbore below the annular sealing device. In this respect, the apparatus for using in sensing temperature in a wellbore may be provided as a fully autonomous system operating as an self-powered unit below an annular sealing device, without having to provide power and/or communication cabling across the annular sealing device e.g. from the surface. In embodiments, the tubing of the apparatus for use in sensing temperature in a wellbore is provided below and extending across the annular sealing device, and wherein a control module of the apparatus for use in sensing temperature is provided in the wellbore above the annular sealing device. The apparatus may still be provided downhole as an autonomous system.

In embodiments, a control module of the apparatus for use in sensing temperature in a wellbore is located at the end of the tubing, optionally at the end of the tubing nearest the surface, optionally below the annular sealing device.

In embodiments, the well apparatus comprises a tubular element and wherein the tubing of the apparatus for use in sensing temperature in a wellbore extends along and/or around the tubular element. In embodiments, the tubular element is one of a generally tubular drill string, a test string, a completion string, a production string, an injection string, a work-over string, an observation string, a suspension string, an abandonment string, a casing string, a fracturing string, a gravel pack string, a screen or a liner. Strings may comprise multiple elements such as pipe, valves, collars, subs, etc., some minor elements of which may not be tubular. In embodiments, the tubing is clamped to the tubular element in the well by which clamping is intended to be understood to include securing by other means, for example, by taping, strapping, bolting, gluing. In embodiments, the apparatus is deployed in the well on wireline, or coiled tubing, and optionally set and/or suspended in the well. The apparatus may be deployed in the well for an extended period of time, optionally at least 6 months, optionally at least 1 year, optionally at least 2 years, optionally up to 5 years, to monitor the temperature of the well. Data from the apparatus can enable the inference of flow rates, and can be used to identify the type of fluid and location of fluid entry, and when used to monitor a barrier can determine the presence or absence of leaks.

In embodiments, the tubing is clamped to and extends across a perforating gun or guns. In this embodiment, the apparatus for use in sensing a temperature in a wellbore can be run in together with guns and, as it is robust enough to withstand the pressure shockwave, the apparatus is then arranged to provide temperature sensing information before, during and after perforation of the well using the guns. The apparatus, or multiple apparatuses, may be deployed along multiple independently activated perforating guns, and thus provide information on changing downhole conditions, as each perforating gun is activated.

In embodiments, the apparatus for use in sensing a temperature in a wellbore can be run in to the well such that the tubing of the apparatus is in a groove on an element of the string, such as a tubular of the well, perforating guns, screen, carrier, sub or packer.

In embodiments, the apparatus can be deployed at a barrier in the well such as a packer, bridge plug, cement, resin, or rigid or flexible barrier material. Data from the apparatus can be used to confirm the integrity of the barrier, there will generally be a temperature change associated with any leak. The apparatus may be deployed around, above, below, and/or within the barrier, In embodiments, the apparatus for use in sensing a temperature in a wellbore can be deployed in a subsea well. This is particularly advantageous for embodiments with memory and/or wireless capability, as the additional complexity, cost, and risk associated with the use of cabled monitoring systems is especially significant in subsea wells.

Viewed from another aspect, the present invention provides a method of calibrating apparatus as described in relation to the above aspect and embodiments, the method comprising: determining the resistance characteristics of the individual circuits associated with each temperature sensor of the apparatus, and compensating for that circuit resistance to isolate the responsiveness of the electrical properties of the temperature sensors to temperature variations. In this way, the resistance of the wires, and the temperature sensitivity thereof, can be compensated for, e.g. where the voltage drop of a conventional diode is being measured at the end of long lines and where the voltage drop along the lines (and where the temperature sensitivity thereof) becomes significant. For constant current diodes configured to function as temperature sensors, this method also allows for compensation for the difference between the voltage supplied at the controller and the actual voltage applied across the sensor, which allows for accurate temperature measurements.

Viewed from another aspect, the present invention provides a method of operation of apparatus as described in relation to the above aspect and embodiments, to determine a thermal characteristic of a temperature sensor thereof, the method comprising: actively heating and/or cooling at least one of the temperature sensors in the tubing; and monitoring a rate of change of temperature of the or each sensor during and/or after heating and/or cooling. In embodiments, the method further comprises, based on the change of temperature, or the rate of change of temperature or the power to create a change temperature of a sensor during and/or after heating, inferring a temperature or a fluid characteristic (such as flow rate or an identification of the type of component fluids in the well) of the environment to which the tubing is exposed at the location of the temperature sensors. In embodiments, actively heating at least one of the temperature sensors in the tubing comprises self-heating the sensors by applying a current therethrough. In embodiments, at least one temperature sensor of the apparatus is heated by applying a current through a resistor or resistance associated with the temperature sensor module. In this way, the temperature sensitivity of the temperature sensor modules and their relative or absolute response to changes in temperature (e.g. by actively heating the sensors, or by sensing ambient changes in temperature) can be used to indicate and provide information usable to infer the operational conditions of the well. For example, when oil enters the well there may be a heating effect, and when water enters the well there may be an even greater heating effect. Conversely, when gas enters the well there is generally a cooling effect. The temperature measured may be of the flow entering the well, or of the combined fluid flow within an annulus or bore. The variation of temperature, and rate of heating and cooling can be used to infer the flow rates and components of fluid in the well. Additionally active heating of the sensors can further assist in identifying fluid types as the heating on the sensors will be affected by the thermal mass of the surrounding fluid, particularly at low flow rates and in static conditions.

The apparatus can be used in at least one of different phases of well life including drilling, testing, completion, production/injection, fracturing, work-over, observation, suspension, and abandonment, to sense temperature along the wellbore and infer fluid characteristics. The apparatus is particularly suited to deployment on the outside of casing, or liner, or screens, or within a gravel pack, or on tubulars in cased or open-hole. The apparatus may be used to monitor production from, or injection to, cross-flow within, or fluid treatment of a well or reservoir.

Where 'across' is used in this patent in the context of the tubing, where appropriate it may be interpreted as across, along, or around, that is it may run the partial, entire, or extend beyond the length of an associated tubular, and/or be wrapped around said tubular in a ring or helix.

BRIEF DESCRIPTION OF THE DRAWINGS

Aspects of the invention will now be described in more detail in relation to certain exemplary embodiments, with reference to the accompanying drawings, in which.

DESCRIPTION OF THE EMBODIMENTS

Figure 1:
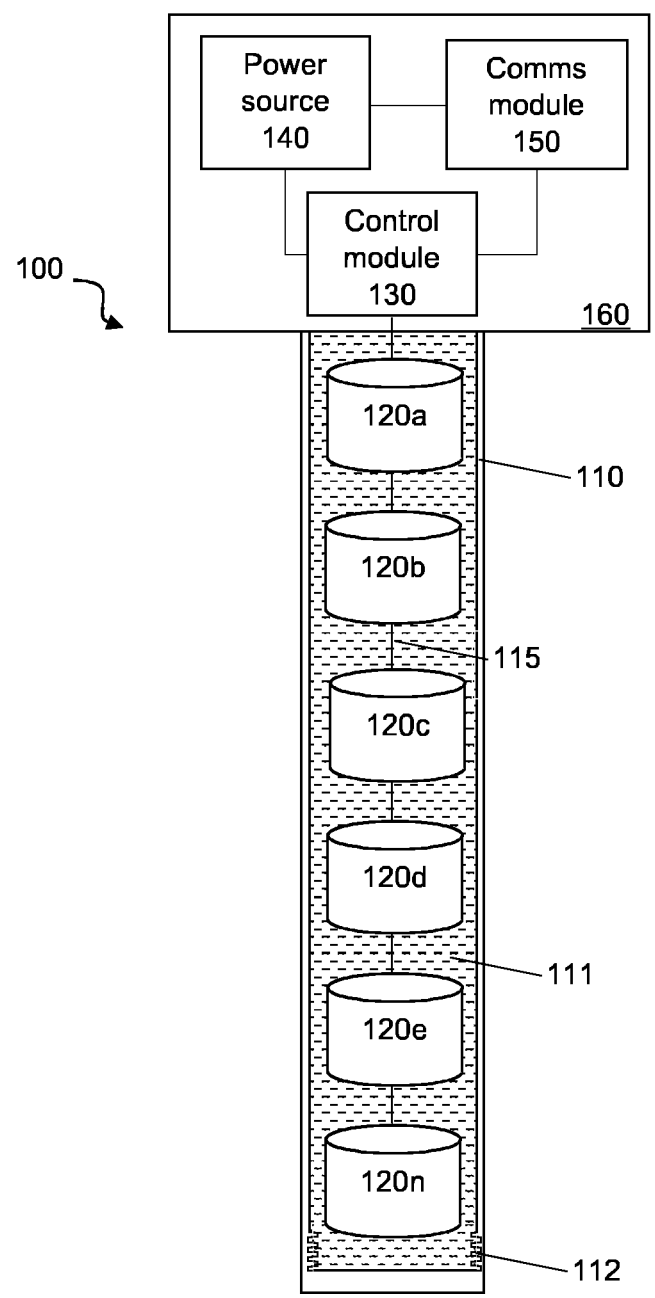
FIG. 1 shows a schematic illustration of an embodiment of an apparatus for use in sensing temperature in a wellbore comprising semiconductor temperature sensors in accordance with aspects of the present invention.

Referring now to FIG. 1, embodiments in accordance with aspects of the invention provide apparatus 100 for use in sensing temperature in a wellbore. As will be explained in more detail in relation to FIG. 2, the apparatus 100 is to be placed in a wellbore e.g. during a well test, to sense a temperature therein and to communicate the temperature sensed thereby to the surface.

The apparatus 100 comprises tubing 110 comprising a plurality of temperature sensor modules 120*a*, 120*b*, 120*c* . . . 120*n* provided at locations along the inside of the tubing 110. As will be explained in more detail below, the temperature sensor modules 120*a*, 120*b*, 120*c* . . . 120*n* each comprise a temperature sensor having electrical properties that vary with temperature.

In embodiments, the tubing 110 is metallic, preferably, one of a stainless steel, a duplex or super-duplex stainless steel, a nickel alloy, titanium or a titanium alloy. In embodiments, the tubing outer diameter is in the range of 3 mm to 14 mm. A smaller diameter tubing, such as a 6 mm (¼ inch) tubing, may be used for normal deployments. Where a more robust system is needed, for example to withstand pressure shockwaves of guns for perforating casing, a larger diameter tubing, such as a 10 mm (⅜ inch) tubing may be used. The tubing 110 is filled with and encapsulates a non-conducting oil 111 that acts to protect the temperature sensor modules 120*a*, 120*b*, 120*c* . . . 120*n*, particularly from pressure shockwaves. The tubing 110 comprises a bellows 112 configured to act as pressure balancing means to equalise internal pressure in the tubing with the ambient environment. To provide further protection from pressure shockwaves (such as from guns) and from the ambient environment the temperature sensor modules 120*a*, 120*b*, 120*c* . . . 120*n* are encased in a polyurethane resin or another suitable potting compound such as a thermoset plastic, epoxy resin or a silicone or rubber gel.

As can be seen from the schematic illustration of FIG. 1, the outer profile of the tubing 110 remains substantially constant along the length of the tubing 110 insofar as that all of the temperature sensor modules 120*a*, 120*b*, 120*c* . . . 120*n* do not cause the tubing 110 to need to have a larger diameter at the location of the sensors in order to accommodate them. Rather, the temperature sensor modules 120*a*, 120*b*, 120*c* . . . 120*n* are accommodated inside the tubing. In embodiments, the tubing profile may vary for other reasons (e.g. the presence of other components, or to allow connection of other components to the tubing 110) but generally the temperature sensor modules 120 at least do not cause the outer profile or diameter of the tubing 110 to vary.

The temperature sensor modules 120a, 120b, 120c . . . 120n are electrically connected to an electrical network 115 to in use allow measuring of the respective electrical properties of the temperature sensors to infer a thermal characteristic thereof. The apparatus 100 further comprises a control module 130 that electrically connected to the temperature sensor modules 120a, 120b, 120c . . . 120n via the electrical network 115. The control module 130 is arranged to in use receive and process an electrical signal associated with the temperature sensor modules 120a, 120b, 120c . . . 120n to enable inference of the temperature thereof and the environment to which the tubing is exposed at the location of that temperature sensor module. A resistive heating element (not shown) may be provided in the tubing 110 alongside temperature sensor modules 120a, 120b, 120c . . . 120n to heat the temperature sensor modules 120a, 120b, 120c . . . 120n in use in order to gauge, e.g. a heating or cooling effect by a flow of the surrounding fluid in the wellbore. Where a separate heating element is not provided, other suitable mechanisms for heating the temperature sensor modules 120a, 120b, 120c . . . 120n, such as self heating by applying a high current through the semiconductor sensing element, may be used.

The apparatus 100 also comprises a power source 140 and a communications module 150 that are provided together with the control module 130 in a module housing 160. The module housing 160 is provided at an end of tubing 110, and the tubing 110 is coupled thereto. The module housing 160 may have more than one length of tubing 110 containing temperature sensor modules extending therefrom. For example, the module housing 160 may have picked up tubing 110 extending from opposite sides thereof such that it is provided the middle of the apparatus 100 for sensing temperature along a wellbore. In the embodiment shown, a single control module 150 is provided. In alternative embodiments, multiple control modules may be provided, wherein individual control modules control sets of temperature sensor modules, and the control modules may be linked to one or more master control modules.

The power source 140 is coupled to the control module 130, temperature sensor modules 120a, 120b, 120c . . . 120n via the control module 130, and the communications module 150, and is configured to provide operational electrical power thereto in use. The power source 140 is arranged to be provided as an in-well power source (i.e. the power is generated or sourced locally to the apparatus in the well, preferably without any wired link to a remote power source) in use and is provided as a battery pack comprising a plurality of primary cells, such as lithium-based cells, which provide capacity sufficient to power the apparatus 100 throughout its usable life. Alternatively, or in addition, in other embodiments the power source 140 may also comprise secondary, rechargeable cells, and/or a downhole power generation unit, such as a turbine. The battery may be at least one of a high temperature lithium thionyl chloride battery and a lithium sulphuryl chloride battery. High temperature batteries are those operable above 85° C. and sometimes above 100° C. Further still, in other implementations the apparatus 100 may alternatively or in addition be configured to be powered in use from a remote power source coupled wirelessly, e.g., by via inductive or capacitive coupling, such that the downhole power source 140 may or may not need to be provided. In use, the remote power source may be located at a position higher in the well, or at the surface.

The communications module 150 is configured to transmit, in use, e.g. to the surface, signals indicative of a temperature sensed in the wellbore by one or more temperature sensor modules 120a, 120b, 120c . . . 120n of the apparatus. The transmitted signals indicative of a temperature sensed in the wellbore may be immediately representative of the measured temperatures (whether that is absolute or relative temperatures), meaning that the control module 130 has performed processing to evaluate the temperature data, although further processing of the temperature data may still be needed at the surface to refine or analyse the results. Alternatively, the transmitted signals indicative of a temperature sensed in the wellbore may be in a more "raw" form and require further processing at the surface in order to reveal the measured temperatures (whether that is absolute or relative temperatures).

The communications module 150 is a wireless data communication module arranged to, in use, wirelessly transmit along the well the signals indicative of a temperature sensed in the wellbore by the apparatus.

Preferably the wireless signals are such that they are capable of passing through a barrier, such as a plug or said annular sealing device, when fixed in place. Preferably therefore the wireless signals are transmitted in at least one of the following forms: electromagnetic (EM), acoustic, coded pressure pulsing and inductively coupled tubulars.

The signals may be data or control signals which need not be in the same wireless form. Accordingly, the options set out herein for different types of wireless signals are independently applicable to data and control signals. The control signals can control downhole devices including sensors. Data from sensors may be transmitted in response to a control signal. Moreover data acquisition and/or transmission parameters, such as acquisition and/or transmission rate or resolution, may be varied using suitable control signals.

EM/Acoustic and coded pressure pulsing use the well, borehole or formation as the medium of transmission. The EM/acoustic or pressure signal may be sent from the well, or from the surface. If provided in the well, an EM/acoustic signal can travel through any annular sealing device, although for certain embodiments, it may travel indirectly, for example around any annular sealing device.

Electromagnetic and acoustic signals are especially preferred—they can transmit through/past an annular sealing device or annular barrier without special inductively coupled tubulars infrastructure, and for data transmission, the amount of information that can be transmitted is normally higher compared to coded pressure pulsing, especially receiving information, such as data, from the well.

Therefore, the communication device may comprise an acoustic communication device and the wireless control signal comprises an acoustic control signal and/or the communication device may comprise an electromagnetic communication device and the wireless control signal comprises an electromagnetic control signal.

Similarly the transmitters and receivers used correspond with the type of wireless signals used. For example an acoustic transmitter and receiver are used if acoustic signals are used.

Thus, the EM/acoustic or pressure wireless signals can be conveyed a relatively long distance as wireless signals, sent for at least 200 m, optionally more than 400 m or longer which is a clear benefit over other short range signals. Embodiments including inductively coupled tubulars provide this advantage/effect by the combination of the integral wire and the inductive couplings. The distance traveled may be much longer, depending on the length of the well.

The control signal, and optionally other signals, may be sent in wireless form from above the annular sealing device to below the annular sealing device. Likewise signals may be sent from below the annular sealing device to above the annular sealing device in wireless form.

Data and commands within the signal may be relayed or transmitted by other means. Thus the wireless signals could be converted to other types of wireless or wired signals, and optionally relayed, by the same or by other means, such as hydraulic, electrical and fibre optic lines. In one embodiment, the signals may be transmitted through a cable for a first distance, such as over 400 m, and then transmitted via acoustic or EM communications for a smaller distance, such as 200 m. In another embodiment they are transmitted for 500 m using coded pressure pulsing and then 1000 m using a hydraulic line.

Thus whilst non-wireless means may be used to transmit the signal in addition to the wireless means, preferred configurations preferentially use wireless communication. Thus, whilst the distance traveled by the signal is dependent on the depth of the well, often the wireless signal, including relays but not including any non-wireless transmission, travel for more than 1000 m or more than 2000 m. Preferred embodiments also have signals transferred by wireless signals (including relays but not including non-wireless means) at least half the distance from the surface of the well to the apparatus.

Different wireless signals may be used in the same well for communications going from the well towards the surface, and for communications going from the surface into the well.

Thus, the wireless signal may be sent to the communication device, directly or indirectly, for example making use of in-well relays above and/or below any annular sealing device. The wireless signal may be sent from the surface or from a wireline/coiled tubing (or tractor) run probe at any point in the well above any annular sealing device. For certain embodiments, the probe may be positioned relatively close to any annular sealing device for example less than 30 m therefrom, or less than 15 m.

The abovementioned wireless signal transmission techniques will now be briefly described in turn.

Inductively Coupled Tubulars

Where inductively coupled tubulars are used, there are normally at least ten, usually many more, individual lengths of inductively coupled tubular which are joined together in use, to form a string of inductively coupled tubulars. They have an integral wire and may be formed of tubulars such as tubing drill pipe or casing. At each connection between adjacent lengths there is an inductive coupling. The inductively coupled tubulars that may be used can be provided by N O V under the brand Intellipipe®.

Coded Pressure Pulses

Pressure pulses include methods of communicating from/to within the well/borehole, from/to at least one of a further location within the well/borehole, and the surface of the well/borehole, using positive and/or negative pressure changes, and/or flow rate changes of a fluid in a tubular and/or annular space.

Coded pressure pulses are such pressure pulses where a modulation scheme has been used to encode commands and/or data within the pressure or flow rate variations and a transducer is used within the well/borehole to detect and/or generate the variations, and/or an electronic system is used within the well/borehole to encode and/or decode commands and/or the data. Therefore, pressure pulses used with an in-well/borehole electronic interface are herein defined as coded pressure pulses.

Where coded pressure pulses are used to transmit control signals, various modulation schemes may be used to encode data such as rate of pressure change, on/off keyed (OOK), pulse position modulation (PPM), pulse width modulation (PWM), frequency shift keying (FSK), pressure shift keying (PSK), amplitude shift keying (ASK), combinations of modulation schemes may also be used, for example, OOK-PPM-PWM. Data rates for coded pressure modulation schemes are generally low, typically less than 10 bps, and may be less than 0.1 bps. An advantage of coded pressure pulses, as defined herein, is that they can be sent to electronic interfaces and may provide greater data rate and/or bandwidth than pressure pulses sent to mechanical interfaces.

Coded pressure pulses can be induced in static or flowing fluids and may be detected by directly or indirectly measuring changes in pressure and/or flow rate. Fluids include liquids, gasses and multiphase fluids, and may be static control fluids, and/or fluids being produced from or injected in to the well.

Acoustic

Acoustic signals and communication may include transmission through vibration of the structure of the well including tubulars, casing, liner, drill pipe, drill collars, tubing, coil tubing, sucker rod, downhole tools; transmission via fluid (including through gas), including transmission through fluids in uncased sections of the well, within tubulars, and within annular spaces; transmission through static or flowing fluids; mechanical transmission through wireline, slickline or coiled rod; transmission through the earth; transmission through wellhead equipment. Communication through the structure and/or through the fluid are preferred.

Acoustic transmission may be at sub-sonic (<20 Hz), sonic (20 Hz-20 kHz), and ultrasonic frequencies (20 kHz-2 MHz). Preferably the acoustic transmission is sonic (20 Hz-20 khz).

The acoustic signals and communications may include Frequency Shift Keying (FSK) and/or Phase Shift Keying (PSK) modulation methods, and/or more advanced derivatives of these methods, such as Quadrature Phase Shift Keying (QPSK) or Quadrature Amplitude Modulation (QAM), and preferably incorporating Spread Spectrum Techniques. Typically they are adapted to automatically tune acoustic signalling frequencies and methods to suit well conditions.

The acoustic signals and communications may be unidirectional or bi-directional. Piezoelectric, moving coil transducer or magnetostrictive transducers may be used to send and/or receive the signal.

EM

Electromagnetic (EM) (sometimes referred to as Quasi-Static (QS)) wireless communication is normally in the frequency bands of: (selected based on propagation characteristics)

sub-ELF (extremely low frequency)<3 Hz (normally above 0.01 Hz);

ELF 3 Hz to 30 Hz;

SLF (super low frequency) 30 Hz to 300 Hz;

ULF (ultra low frequency) 300 Hz to 3 kHz; and,

VLF (very low frequency) 3 kHz to 30 kHz.

An exception to the above frequencies is EM communication using the pipe as a wave guide, particularly, but not exclusively when the pipe is gas filled, in which case frequencies from 30 kHz to 30 GHz may typically be used dependent on the pipe size, the fluid in the pipe, and the range of communication. The fluid in the pipe is preferably non-conductive. U.S. Pat. No. 5,831,549 describes a telemetry system involving gigahertz transmission in a gas filled tubular waveguide.

Sub-ELF and/or ELF are preferred for communications from a well to the surface (e.g. over a distance of above 100 m). For more local communications, for example less than 10 m, VLF is preferred. The nomenclature used for these ranges is defined by the International Telecommunication Union (ITU).

EM communications may include transmitting data by one or more of the following: imposing a modulated current on an elongate member and using the earth as return; transmitting current in one tubular and providing a return path in a second tubular; use of a second well as part of a current path; near-field or far-field transmission; creating a current loop within a portion of the well metalwork in order to create a potential difference between the metalwork and earth; use of spaced contacts to create an electric dipole transmitter; use of a toroidal transformer to impose current in the well metalwork; use of an insulating sub; a coil antenna to create a modulated time varying magnetic field for local or through formation transmission; transmission within the well casing; use of the elongate member and earth as a coaxial transmission line; use of a tubular as a wave guide; transmission outwith the well casing.

Especially useful is imposing a modulated current on an elongate member and using the earth as return; creating a current loop within a portion of the well metalwork in order to create a potential difference between the metalwork and earth; use of spaced contacts to create an electric dipole transmitter; and use of a toroidal transformer to impose current in the well metalwork.

To control and direct current advantageously, a number of different techniques may be used. For example one or more of: use of an insulating coating or spacers on well tubulars; selection of well control fluids or cements within or outwith tubulars to electrically conduct with or insulate tubulars; use of a toroid of high magnetic permeability to create inductance and hence an impedance; use of an insulated wire, cable or insulated elongate conductor for part of the transmission path or antenna; use of a tubular as a circular waveguide, using SHF (3 GHz to 30 GHz) and UHF (300 MHz to 3 GHz) frequency bands.

Suitable means for receiving the transmitted signal are also provided, these may include detection of a current flow; detection of a potential difference; use of a dipole antenna; use of a coil antenna; use of a toroidal transformer; use of a Hall effect or similar magnetic field detector; use of sections of the well metalwork as part of a dipole antenna.

Where the phrase "elongate member" is used, for the purposes of EM transmission, this could also mean any elongate electrical conductor including: liner; casing; tubing or tubular; coil tubing; sucker rod; wireline; slickline or coiled rod.

A means to communicate signals within a well with electrically conductive casing is disclosed in U.S. Pat. No. 5,394,141 by Soulier and U.S. Pat. No. 5,576,703 by MacLeod et al both of which are incorporated herein by reference in their entirety. A transmitter comprising oscillator and power amplifier is connected to spaced contacts at a first location inside the finite resistivity casing to form an electric dipole due to the potential difference created by the current flowing between the contacts as a primary load for the power amplifier. This potential difference creates an electric field external to the dipole which can be detected by either a second pair of spaced contacts and amplifier at a second location due to resulting current flow in the casing or alternatively at the surface between a wellhead and an earth reference electrode.

Relay

A relay comprises a transceiver (or receiver) which can receive a signal, and an amplifier which amplifies the signal for the transceiver (or a transmitter) to transmit it onwards.

There may be at least one relay. The at least one relay (and the transceivers or transmitters associated with the apparatus or at the surface) may be operable to transmit a signal for at least 200 m through the well. One or more relays may be configured to transmit for over 300 m, or over 400 m.

For acoustic communication there may be more than five, or more than ten relays, depending on the depth of the well and the position of the apparatus.

Generally, less relays are required for EM communications. For example, there may be only a single relay. Optionally therefore, an EM relay (and the transceivers or transmitters associated with the apparatus or at the surface) may be configured to transmit for over 500 m, or over 1000 m.

The transmission may be more inhibited in some areas of the well, for example when transmitting across a packer. In this case, the relayed signal may travel a shorter distance. However, where a plurality of acoustic relays are provided, preferably at least three are operable to transmit a signal for at least 200 m through the well.

For inductively coupled pipe, a relay may also be provided, for example every 300-500 m in the well.

The relays may keep at least a proportion of the data for later retrieval in a suitable memory means.

Taking these factors into account, and also the nature of the well, the relays can therefore be spaced apart accordingly in the well.

The wireless signals may cause, in effect, immediate activation, or may be configured to activate the apparatus after a time delay, and/or if other conditions are present such as a particular pressure change.

The apparatus 100, in particular temperature sensor modules 120a . . . n, the control module 130 and/or the communications module 150, may comprises one or more microprocessors. Electronics in the apparatus, to power various components such as the microprocessor, control and communication systems, are preferably low power electronics. Low power electronics can incorporate features such as low voltage microcontrollers, and the use of 'sleep' modes where the majority of the electronic systems are powered off and a low frequency oscillator, such as a 10-100 kHz, for example 32 kHz, oscillator used to maintain system timing and 'wake-up' functions. Synchronised short range wireless (for example EM in the VLF range) communication techniques can be used between different components of the system to minimize the time that individual components need to be kept 'awake', and hence maximise 'sleep' time and power saving.

The low power electronics facilitates long term use of various components of the apparatus. The control mechanism may be configured to be controllable by the wireless control signal up to more than 24 hours after being run into the well, optionally more than 7 days, more than 1 month, or more than 1 year or more than 5 years. It can be configured to remain dormant before and/or after being activated.

In this way, by the use of an in-well power source 140 and a wireless communications module 150 and/or a memory device for wirelessly conveying/locally storing data including sensor data, the apparatus 100 for use in sensing a temperature along a wellbore may be configured to operate as an "autonomous" system downhole. The apparatus may include one or more housings or enclosures supporting one or more of the in-well power source 140, wireless communications module 150 and/or memory device such that it is configured as an autonomous system for installation downhole. In these configurations, the apparatus may, in use, require no cabling to receive power from or transmit signals to the surface. This means that the apparatus 100 can be reliable and easy to deploy, and in addition, where only a short section of the well is being measured, cabling and apparatus needs only to be provided in the region of the well under test. That is unlike the prior art fibre optic temperature sensor systems and the WellWatcher Flux™ in which cabling needs to be provided all the way from the sensed location to the surface, which can be incredibly inconvenient and problematic where, for example, the temperature of a short section of the well (say 20 m long) needs to be tested at a well depth of greater than 500 m, which itself is subsea at a depth of 3 km from the water surface. Using the apparatus 100, only a short, 20 m long length of tubing 110 and the module housing 160 needs to be provided in the well, whereas in the prior art, cabling over 3.5 km is needed to obtain a sensed temperature in the 20 m section of the wellbore.

In that respect, the tubing 110 is typically 10 to 200 metres in length, and the temperature sensor modules are typically spaced in the tubing at a spacing distance in the range 0.25 to 10 metres. The length of the tubing and spacing of the sensor modules can be chosen so as to obtain a desired measurement span and spatial resolution. While the tubing 110 shown in FIG. 1 is "straight" in that it is arranged to extend along the wellbore substantially along the axis of the wellbore, in other embodiments the tubing 110 can be arranged as a ring or helix to extend around a tubular element of a well apparatus. Here, the tubing length and/or sensor spacing can be shorter, and the apparatus in this arrangement can reveal information about the azimuthal variation in sensed temperature at locations in the wellbore, which can be reveal information about a direction of flow of fluid in the wellbore.

Figure 2:
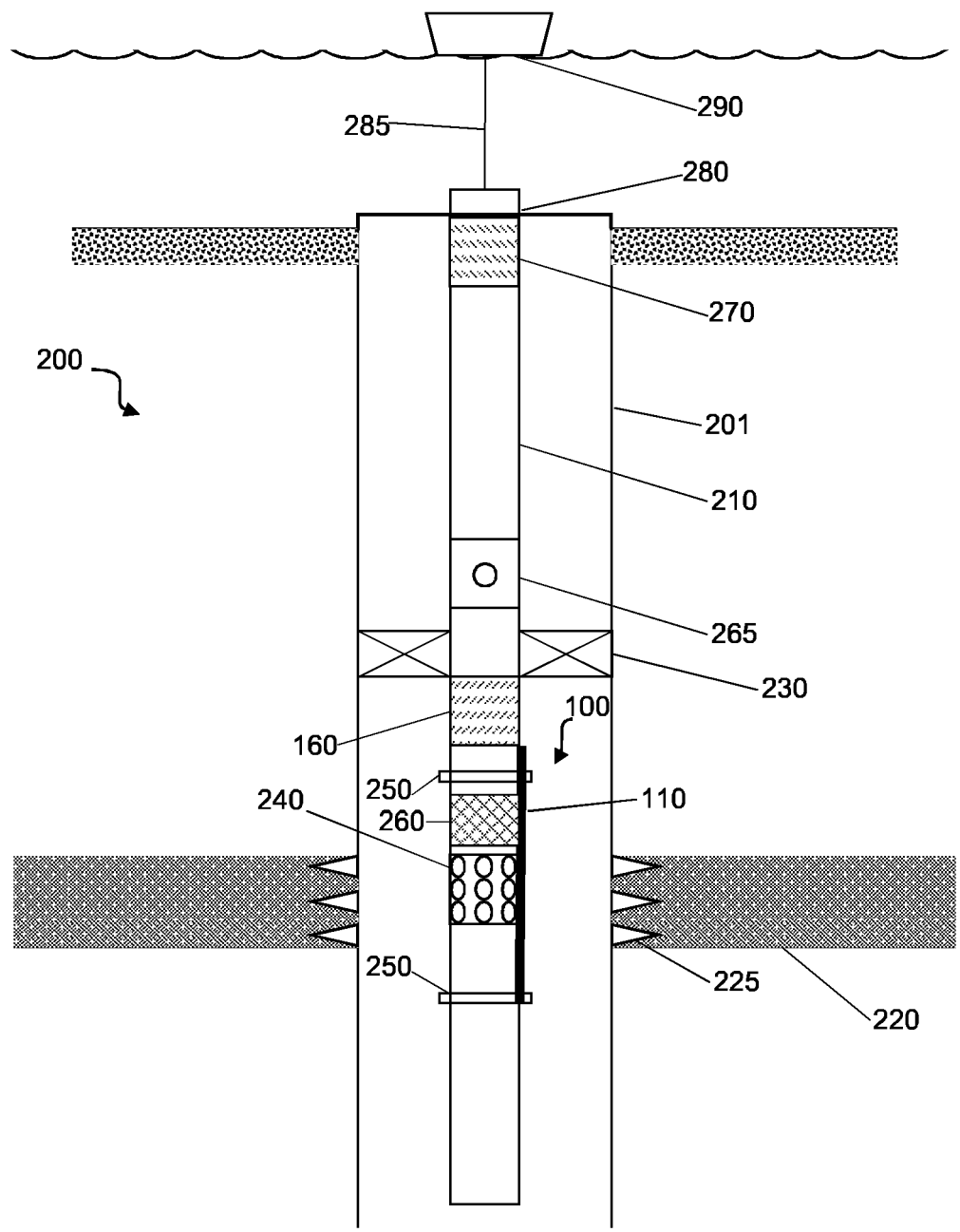
FIG. 2 shows a schematic illustration of a typical deployment of the apparatus shown in FIG. 1 in a subsea well.

Reference will now be made to FIG. 2, which shows a typical deployment of the apparatus 100 shown in FIG. 1 in a subsea well 200.

The well 200 comprises a wellbore 201 that has been drilled using a drillship or semisubmersible rig and which has been subsequently lined and cased (not shown). By wellbore in this disclosure it is meant, as necessary, the inward-facing wall of a drilled openhole well, or the or part of the void defined thereby, or, as context requires, even the inward-facing surface of a casing of a cased well, or the or part of the void defined thereby. The wellbore 201 is often an at least partially vertical well. Nevertheless, it can be a deviated or horizontal well. References such as "above" and "below", when applied to deviated or horizontal wells should be construed as their equivalent in wells with some vertical orientation. For example, "above" is closer to the surface of the well.

A drill stem test is now being performed using a tubular element provided by a drill stem test (DST) string 210 in which the drill bit has been removed from the drill string and replaced with testing and sensing equipment as a sensor string 210 run into the well to assess the geological formation 220.

A redeployable packer is provided as an annular seal 230 arranged above a formation 220 to be tested. A gun module 240 comprising a series of shaped charges is provided in the string 210 which, in use, is fired to form perforations 225 through the casing and into the formation 220 to stimulate a flow of product.

The apparatus 100 shown in FIG. 1 for sensing a temperature in a wellbore is provided in the DST string 210 arranged below the annular sealing device 230 such that the tubing 110 is not required to traverse the seal. The module housing 160 is annularly configured to permit flow there through and is arranged in the string 210 below the annular seal 230 and the tubing 110 runs along the outer surface of the string 210 (e.g. in a groove) along the wellbore and across guns and is clamped thereto using clamps 250. The clamps 250 may be configured to act as straps, to strap the tubing 110 to the string 210. Further clamps (not shown) may be provided, in particular, along the perforating gun, to ensure that the tubing is retained clear of the perforating charges.

A ported sleeve 260 is provided, opening the cased hole into the tubular element of the drill string 210, through which, upon opening of the valve 265, product is permitted to flow under pressure from the perforations 225 in the formation 220 into the tubular element of the DST string 210 to the wellhead 280, which is sealed by a blow out preventer (BOP), or the like, provided at the surface of the well. The surface of the well is the top of the uppermost casing of the well.

As the product flows, the temperature sensor modules 120a, 120b, 120c . . . 120n of the apparatus 100 are sensing the temperature in the cased well and generating electrical signals that are received and processed by the control module 130 via the electrical network 115. The communications module 130 then generates a signal indicative of the temperature at one or more of the temperature sensor modules 120a, 120b, 120c . . . 120n which is then processed by the communications module 150 and encoded into acoustic pulses and transmitted along the DST string 210. An acoustic signal receiver 270 located in the DST string at or near the well head 280 detects and decodes the wirelessly transmitted acoustic signal (which may have been conveyed to the well head by a network of relays and repeaters (not shown)). Data or control signals may be relayed between two or more locations above the annular sealing device wirelessly, by wires and/or by fibre optics. Similarly, data or control signals may be relayed between two or more locations below the annular sealing device wirelessly, by wires and/or by fibre optics.

The decoded data signal is then conveyed via an electrical coupling 285 to a rig or ship 290 at the surface where it may be processed further to allow analysis of the sensed temperature data. By analysing the temperature data, detailed information may be obtained indicating the type of fluid flowing in the well, the flow rate and/or the location thereof. If the tubing 110 is arranged along guns 240, the heating effect of the guns as a result of their ignition can be detected, allowing a determination to be made as to whether or not the guns all fired. Before, during, and after perforation the temperature profile of the perforated section can be continuously monitored, and flow from/to the formation assessed. Similarly, if the tubing 110 is arranged around an annular sealing device such as a packer, the heating or cooling effect due to fluid flow from leaks can be detected, allowing an identification to be made as to when sealing elements are and are not effective.

Instead of the apparatus 100 for use in sensing temperature in a wellbore being provided entirely below and not extending across the annular sealing device 230, in other arrangements, the tubing 110 may extend across the annular sealing device 230 through a bypass port thereof.

The apparatus 100 may comprise a memory device, which can store data for retrieval at a later time. The data may be retrieved by a variety of methods. For example it may be transmitted wirelessly at a later time, optionally in response to an instruction to transmit. Or it may retrieved by a probe run into the well on wireline/coiled tubing or a tractor. The probe can optionally couple with the memory device physically or wirelessly.

Where separate, the memory device and sensors/probe may be connected together by any suitable means, optionally wirelessly or physically coupled together by a wire. Inductive coupling is also an option. Short range wireless coupling may be facilitated by EM communication in the VLF range.

The apparatus may be configured to store and/or transmit sensor data. The storing of the sensor data may only be for a short period such as up to 1 second or 1 minute, 1 hour or 1 day, for example for the purposes of buffering, or alternatively or in addition, the storing of the sensor data may be for longer periods such as at least a day, at least a month, at least a year, at least 2 years, or at least 5 years, for the purposes of long term data storage and subsequent recovery, or partial recovery, wirelessly, by a wired connection or by physical retrieval.

While FIG. 2 illustrates one possible configuration, it is to be understood that the apparatus 100 may be provided downhole to sense a temperature thereof in a number of possible configurations. The apparatus 100 can be deployed in the well on wireline, or coiled tubing, and can be set and/or suspended in the well. As noted above, the tubing 110 of the apparatus 100 for use in sensing temperature in a wellbore can in embodiments extend along and/or around the tubular element 210, which is typically for conveying product to the surface or tooling into and out of the wellbore. Instead of being a drill stem test string, in other embodiments the tubular element can be a drill string, a test string, a completion string, a production string, an injection string, a work-over string, an observation string, a suspension string, an abandonment string, a casing string, a fracturing string, a gravel pack string, a screen or a liner. The apparatus 110 may be used in other well operations, such as during production, workovers and other interventions, and during well kill operations. FIG. 2 illustrates a particularly useful example of a use of the apparatus 100 in which the tubing 110 is clamped across a gun, and can be run into the well 201 together with the gun. The apparatus can be deployed with and clamped across a number of different possible downhole tools, and clamping across a gun in a drill stem test operation is only one possible example. After use, the apparatus 100 may be discarded, for example, together with spent guns. On the other hand, the apparatus 100 may instead be retrieved and reused at other locations. In embodiments where no communications unit is provided for wireless transmission of sensed temperature data, the temperature data may instead be logged and stored at the apparatus and recovered later after retrieval of the apparatus from the well.

Arrangements for the construction and operation of the temperature sensor modules 120*a*, 120*b*, 120*c* . . . 120*n* and the control module 130 to sense temperature, address the sensor modules, and to process and recover temperature information in accordance with embodiments will now be described.

Figure 3:
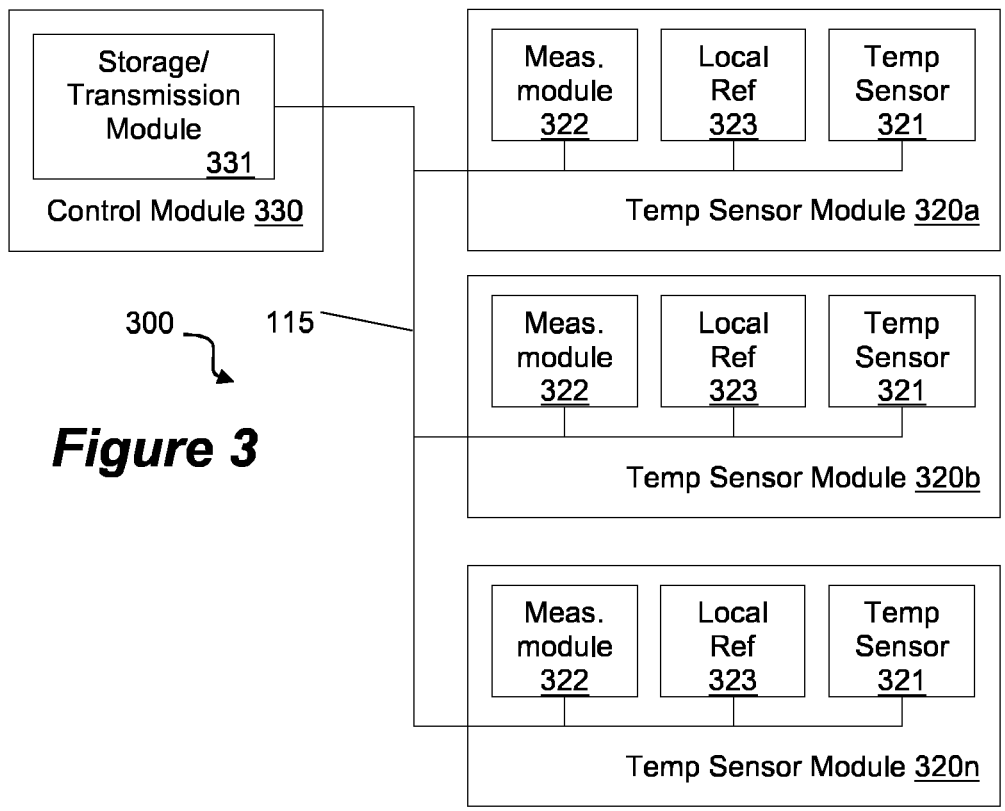
FIG. 3 shows a schematic illustration of an arrangement for the construction and operation of the semiconductor temperature sensor modules and the control module of an apparatus as shown in FIG. 1 to sense temperature, address the sensor modules, and to process and recover temperature information therefrom in accordance with another embodiment where local references are used.

One possible arrangement is shown in FIG. 3. Here, the apparatus 300 comprises plural temperature sensor modules 320*a*, 320*b*, 320*c* . . . 320*n* connected to a control module 330. Each temperature sensor module comprises a temperature sensor 321 provided at least in part by at least one semiconductor element, such as a diode or an integrated circuit temperature sensor, a resistance thermometer, such as a platinum resistance thermometer, or a crystal oscillator such as a quartz crystal. The temperature sensor 321 has electrical properties that vary with temperature. Each temperature sensor module 320*a*, 320*b*, 320*c* . . . 320*n* further comprises a measurement module 322 that takes a signal or measures a temperature-dependent electrical property from the temperature sensor 321, compares it with a temperature calibrated local reference 323 that is arranged to provide a signal against which variations in the temperature from the measurement from the temperature sensor 321 can be revealed by the measurement module 322. The measurement modules 322 thus produce data representative of the temperature measured at each temperature sensor module 320*a*, 320*b*, 320*c* . . . 320*n* and transmit that data to the control module 330 via the electrical network 115 which, as will be explained in more detail below, is configured as a matrix (it should be noted here that the electrical network 115 is represented only figuratively to illustrate an electrical connection between the temperature sensor modules and the control module, and it is not intended to represent a wiring diagram). The sensed temperature data can be transmitted to the control module 330 as an analogue signal, as the temperature sensor modules 320*a*, 320*b*, 320*c* . . . 320*n* may be individually isolatable in the electrical network 115. Alternatively, the data can be digitally encoded at the temperature sensor modules 320*a*, 320*b*, 320*c* . . . 320*n* and transmitted to the control module 330. Miniaturisation of the sensor module may be achieved by mounting components on a miniature flexible printed circuit and/or application specific integrated circuits (ASICs) can be used.

At the control module 330, a storage and transmission module 331 is provided to effectively buffer the measured temperature data whereupon it can be passed to the communications module 150 for communication to the surface. An advantage of providing a measurement module and local reference at each temperature sensor module is that data can be readily transmitted to the control module 330 and the effect of the electrical network on the signal, such as from noise, and the temperature sensitivity of the wire resistance, can be mitigated. While, as will be explained in more detail below, the switching of the wires of the matrix electrical network 115 permits an analogue mechanism for the temperature sensor modules 320*a*, 320*b*, 320*c* . . . 320*n* to transmit their digitally encoded (or analogue) representations of the sensed temperature to the control module 330, a suitable digital addressing system, such as the I²C™, SENT or 1-Wire™ protocols could instead be used to communicate control and measurement information between the temperature sensor modules 320*a*, 320*b*, 320*c* . . . 320*n* and the control module 330. Thus each temperature sensor module 320*a*, 320*b*, 320*c* . . . 320*n* may be provided with an analogue to digital converter and an input/output controller (not shown) in order to digitally encode the data representative of the measured temperature and to control the messaging protocol to send the data to the control module 330. Only very short lengths of wire are used to couple the measurement module 322 to the temperature sensor 321 meaning that the resistance of the wire and the temperature variation thereof is negligible, and no compensation for the wire resistance needs to be made.

While the arrangement shown in FIG. 3 is advantageous for use in a range of different circumstances, the inter-sensor stability may not be high as required for some, particularly long term, uses as the local references at each temperature sensor module can drift over time. What matters in practical applications where information about the flow of fluid in the wellbore is to be revealed by the apparatus, it is the not the monitoring of absolute temperature that is important, but the relative changes in temperature between temperature sensors. Where a degree of inter-sensor drift can occur over time, the relative changes in temperature at the different sensors can be measured less reliably over time of installation. In addition, the provision of the measurement module 322 and local reference 323 (and also a digital input/output controller) at each temperature sensor module 320a, 320b, 320c . . . 320n means that the modules 320a, 320b, 320c . . . 320n may require significant miniaturisation and sophisticated package design in order to enable them to be small enough to be integrated within the small diameter tubing 110 without having to mount or weld the temperature sensor modules as larger outer diameter sections in the tubing. Further, the provision of various electronic components within the temperature sensor modules 320a, 320b, 320c . . . 320n means that they required increased ruggedisation to ensure that they can reliably withstand significant pressure shockwaves, such as from the ignition of shaped charges from guns 240.

Figure 4:
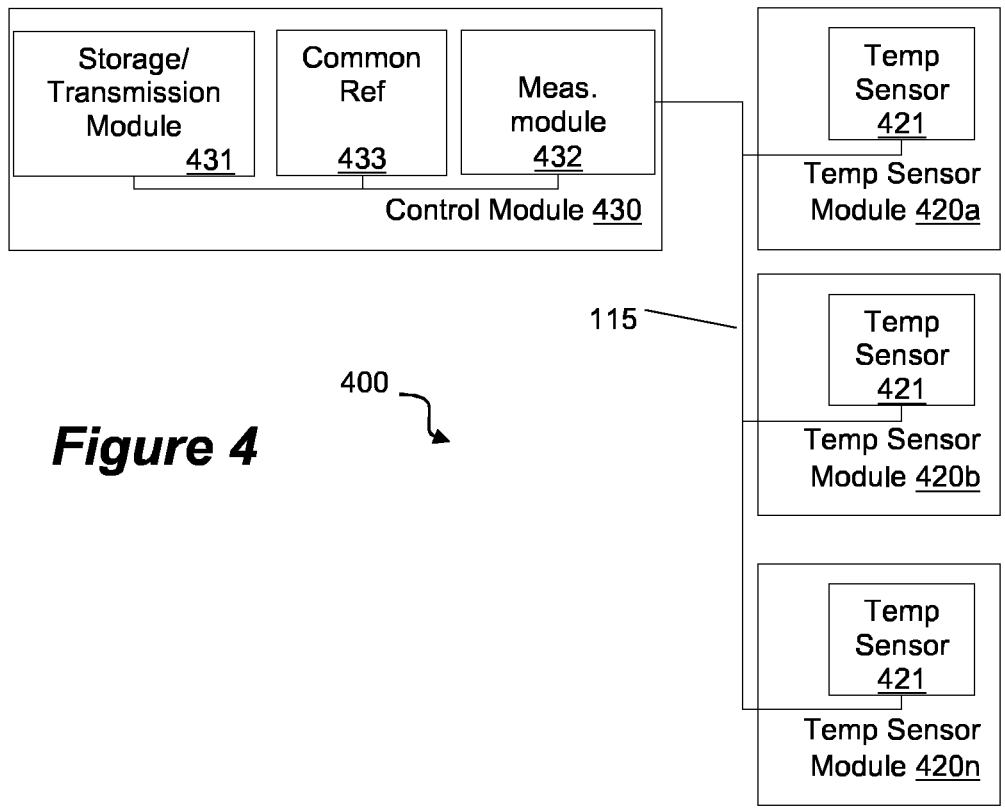
FIG. 4 shows a schematic illustration of an arrangement for the construction and operation of the semiconductor temperature sensor modules and the control module of an apparatus as shown in FIG. 1 to sense temperature, address the sensor modules, and to process and recover temperature information therefrom in accordance with another embodiment where a common reference is used.

The arrangement shown in FIG. 4, however, provides an alternative arrangement for the apparatus that can be of particular use in numerous applications. In the apparatus 400, each temperature sensor module 420a, 420b, 420c . . . 420n comprises a temperature sensor 421 provided at least in part by at least one semiconductor element, such as a diode or an integrated circuit temperature sensor, a resistance thermometer, such as a platinum resistance thermometer, or a crystal oscillator such as a quartz crystal. The temperature sensor 321 has electrical properties that vary with temperature. The local reference and the measurement module at each temperature sensor module of the apparatus 300 is omitted and instead the control module 430 is provided with a measurement module 432 and a common reference 433 that are used to determine a thermal characteristic of each temperature sensor 421 of each temperature sensor module 420a, 420b, 420c . . . 420n. In embodiments, the common reference signal generator is a reference voltage source. In other embodiments, where the temperature sensor 421 is provided at least in part by a crystal oscillator, the common reference signal generator is a reference oscillator. Here, the use of a reference common to all temperature sensor modules 420a, 420b, . . . 420n located at the control module 430 allows the apparatus to provide a relatively high inter-sensor stability as compared to the arrangement shown in FIG. 3, with relatively low drift. This provides the apparatus 400 with a high accuracy and reliability of sensed temperature changes along the length of the tubing 110 over time. The provision of a common reference allows the apparatus 400 of this embodiment to be accurate and reliable for the measurement of the relative changes between the sensors, which is what is important where information is to be gathered about the flow rate and nature of fluids in the wellbore. In addition, the measurement module 432 and common reference 433 are provided in the control module 430 itself, meaning that the temperature sensor modules 420a, 420b, . . . 420n do not need to include these components. Indeed, the temperature sensor modules 420a, 420b, . . . 420n may include no other electronic components other than the temperature sensor 421, which may be provided by a single electronic component (and any necessary electrical interconnects and packaging). As a result, the temperature sensor modules 420a, 420b, . . . 420n can be very small, which allows the temperature sensor components to be easily integrated into the small diameter tubing 110. Further still, as the relatively sensitive electronic components of the measurement module 432 and common reference 433 are provided in the control module 430 itself, the temperature sensor modules 420a, 420b, . . . 420n can easily be made rugged enough to withstand pressure shockwaves due to, for example, the ignition of shaped charges from guns 240. This is particularly the case where appropriately rugged temperature sensors 421 are used and packaged and protected using a potting compound and/or where the tubing 110 is filled with a liquid such as an oil. Further still, the sensor string 410 is relatively simple and cost effective to manufacture, with the temperature sensor modules each being small with very few components and so easy to integrate within the small diameter tubing, and for the control electronics to be provided in a separately assembled control module provided, for example, at an end of or adjacent the tubing.

While FIG. 4 shows the common reference signal generator being used as a reference for the signal indicative of the measurement of the temperature sensed by each of the temperature sensor modules, in embodiments, the common reference generator may be used as a reference for the measurement in relation to fewer than all but at least two of the temperature sensors.

In FIG. 4, the measurement module 432 is located in the control module 430, remote from the temperature sensor modules 420a, 420b, . . . 420n. The signal indicative of the measurement of the temperature sensed by the temperature sensor modules may be represented by a voltage and/or current or other characteristic of the generated signal, such as the signal duration, or the signal may digitally encode the sensed temperature. The measurement module 432 is preferably configured to measure an analogue electrical characteristic of the temperature sensors 421 at a distance, by addressing or connecting exclusively to a temperature sensor 421 of a specific temperature sensor module 420a, 420b . . . 420n through the electrical network 115, or otherwise discerning the electrical characteristic of a particular temperature sensor 421 in a measured analogue signal. This may be achieved by providing the electrical network 115 configured so as to allow the receiving and processing of an separate analogue signal from the different temperature sensors 421 at the control module 430. Examples of suitable electrical network configurations are described below with reference to FIGS. 5 and 6. Alternatively, in order to convey the electrical signal indicative of the temperature sensed by the temperature sensors 421 to the control module 430 for receipt and processing by the measurement module 432, in embodiments, a digital addressing system could again be used whereby each temperature sensor module 420a, 420b, . . . 420n is provided with a digital encoder module (not shown) whereby a signal based on the common reference is passed to the temperature sensor modules and an electrical signal sensed by the temperature sensor 421 is digitised and conveyed as digitally encoded data to the control module using an appropriate digital communication protocol.

Alternatively, a hybrid of FIGS. 3 and 4 may be used (not shown), where a common reference at the control module is supplied to each temperature sensor module, and a measurement module provided at each temperature sensor module. A digital signal representative of temperature can be used to communicate the measurement to the control module.

Figure 5:
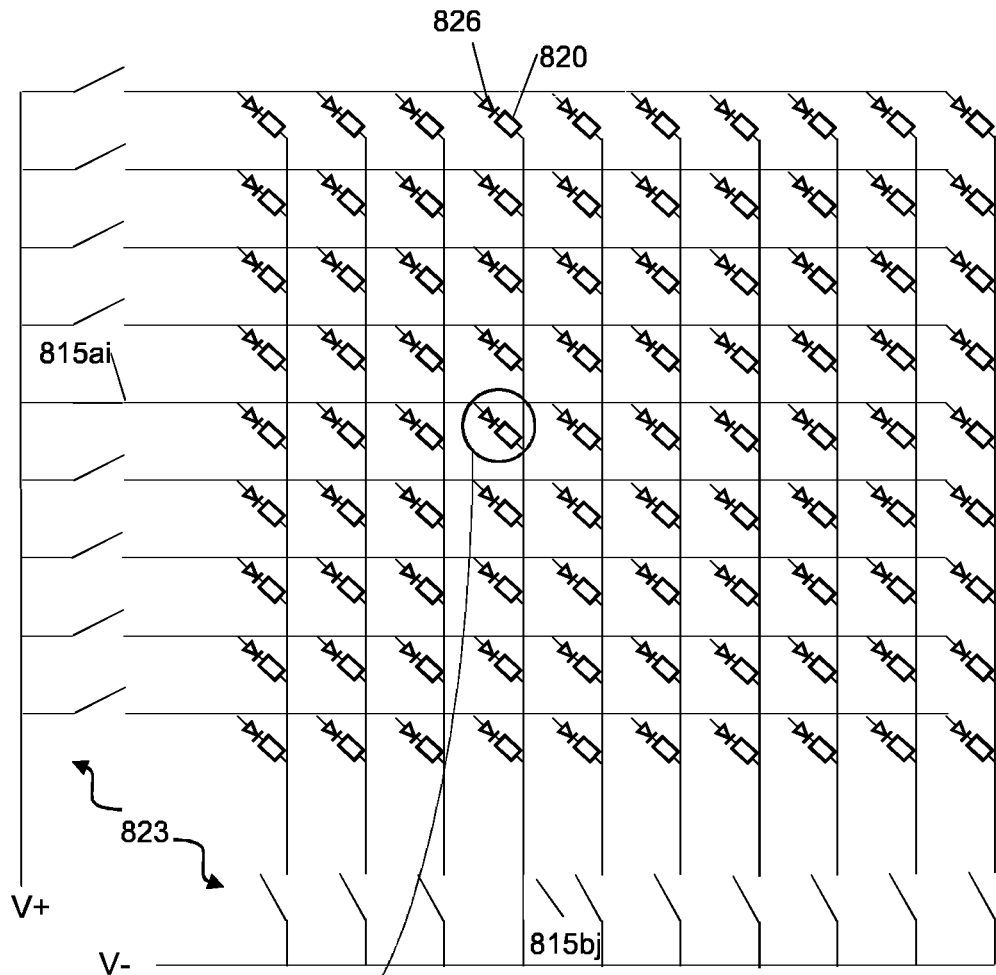
FIG. 5 shows a schematic illustration of an arrangement for the apparatus in accordance with another embodiment for connecting the semiconductor temperature sensor modules to the control module to receive an analogue signal therefrom using first and second groups of wires arranged as a matrix.
Figure 5:
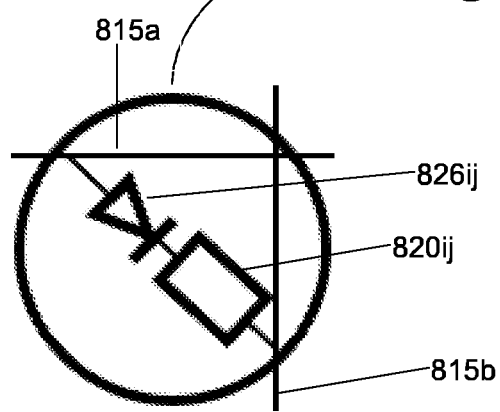
Figure 6:
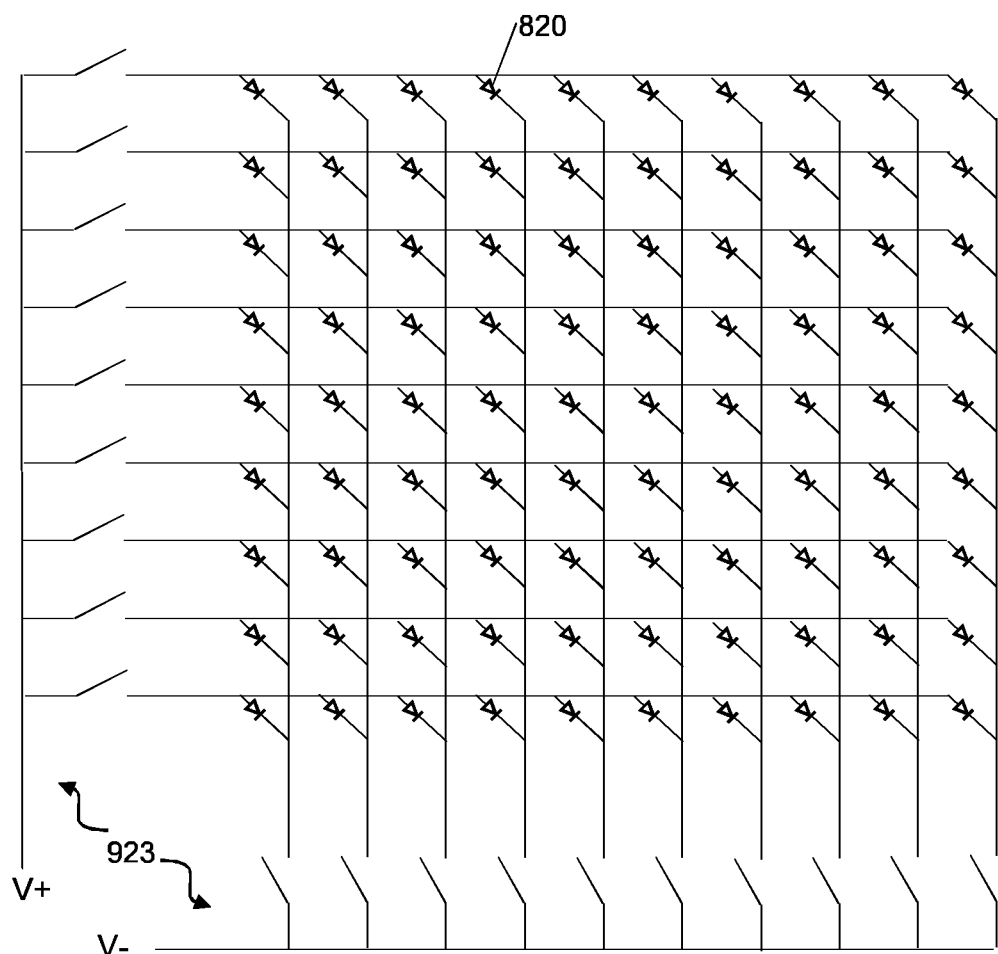
FIG. 6 shows a schematic illustration of an arrangement for the apparatus in accordance with an embodiment in which the semiconductor temperature sensors are provided by diodes, and which are connected to the control module to receive an analogue signal therefrom using first and second groups of wires arranged as a matrix.

FIGS. 5 and 6 show embodiments of wiring arrangements for the electrical network configured as a matrix that is arranged to electrically couple the control module 160 to the temperature sensor modules. Principally these wiring arrangements lend themselves to methods of addressing the temperature sensors and receiving and processing analogue signals therefrom at the control module, although as described above, digital communication protocols may still be used in embodiments.

To achieve a high number of sensors in the array without needing to use a digital communication protocol, when the number of wires in the tubing 110 is limited, in embodiments the wires and temperature sensor modules are arranged in the electrical network as a "matrix" as shown schematically in FIG. 5. In this arrangement 800, the tubing 110 containing the electrical network 115 comprises plural wires that connect the plural semiconductor temperature sensors modules 820. The wires are configured to provide the electrical network 115 arranged as a matrix by which the wires comprise a first group of wires 815a and a second, different group of wires 815b and each wire of the first group 815a is electrically connected to each wire of the second group 815b once, by different temperature sensor modules 820, such that each module 820 can be individually electrically connected by a pair of wires comprising a first wire from the first group 815a and a second wire from the second group 815b.

In this way, a significantly greater number of temperature sensors can be operated in an analogue addressing regime using the same number of wires. For example, for a standard 19 core wire bundle, a non-matrix analogue arrangement could be used to provide fewer than 19 temperature sensors. The use of a matrix allows a number greater than this to be provided, and for a 19 core wire bundle, grouped into a group of 10 and a group of 9 wires, up to 90 temperature sensor modules 820 can be provided, as shown in FIG. 8. These can be individually addressed by connecting them to the control module (not shown) by provision of switches, which may be operated by a relay or relays 823, and which can switch through combinations of pairs of wires to electrically connect and infer a temperature at each of the temperature sensor modules 820. For example, a particular temperature sensor module 820ij can be connected by switching the relay to connect the ith wire 815ai from the first wire group and the jth wire 815bj from the second wire group, where all of the other wires may be disconnected. The relay 823 can periodically switch through combinations of pairs of wires to electrically connect and infer a temperature at each of the temperature sensor modules.

To prevent unwanted reverse current flow and current leakage through the electrical network, each temperature sensor module 820 includes, or is connected in series with a blocking diode 826. Thus the diodes 826 are low reverse current leakage diodes, having a reverse current leakage of less than 50 nA at the operational voltage of the apparatus 800 and at a temperature of 25 degrees Celsius. The temperature sensitivity of each of the temperature sensor modules 820 is provided at least in part by a semiconductor component, which may be an integrated circuit temperature sensor or a second diode provided in addition to the blocking diode. Alternatively, instead of providing a blocking diode 826, the blocking effect may be provided by another component such as a FET, and the blocking component and the semiconductor component providing temperature sensitivity of the temperature sensor modules may be combined together or integrated into an IC.

In embodiments, such as in the matrix arrangement shown in FIG. 6, the temperature sensitive semiconductor elements are diodes alone as these can have a temperature dependency that is suitable for use in sensing a temperature along a wellbore. Similarly, diodes can be used as the temperature sensors in each of the arrangements shown in FIGS. 3-5.

In the FIG. 6 arrangement, the temperature sensor modules are effectively provided by a single passive electronic component—i.e. the diodes 920 (discounting any packaging, potting and interconnect wiring for the components), which perform both the reverse current blocking function themselves and provide the temperature sensitivity for measuring local temperature. The arrangement is otherwise the same as that shown in FIG. 5, and so a detailed description is omitted here. This arrangement allows a large number of diodes 920 to simply be connected in a matrix arrangement to wires in a core bundle inside small diameter tubing in order to provide a temperature sensor array for use downhole that is easy to install and robust enough to be reliably operated downhole and to even withstand pressure shockwaves resulting from, for example, the ignition of perforation guns. Indeed, such an arrangement can be run in together with and clamped across guns. In embodiments, the diodes are low reverse current leakage diodes, having a reverse current leakage of less than 50 nA at the operational voltage of the apparatus and at a temperature of 25 degrees Celsius.

Suitable conventional ("constant voltage") diodes, such as small signal or Schottky diodes, exhibit a voltage drop across the diode which is kept relatively constant independent of small variations in current, however, the voltage drop across the diode varies with temperature. Hence the temperature can be sensed using a voltage measurement of such a diode.

Alternatively, constant current diodes can be used, as described above.

Instead of simply using diodes, other suitable semiconductor elements may be used to provide the temperature sensitivity of the temperature sensor modules. In embodiments the temperature sensitive semiconductor elements are provided in integrated circuit temperature sensors configured to vary a current or a voltage with a temperature of the sensor. The integrated circuit temperature sensors are configured as silicon bandgap temperature sensors each having two p-n junctions that, in use, are operated at different current densities to infer a temperature by determining a voltage difference between the two p-n junctions at the different current densities, which is proportional to absolute temperature.

In the arrangements shown in FIGS. 3 to 6, the temperature sensitivity of the temperature sensor modules may be provided at least in part or solely by at least one semiconductor element having electrical properties that vary with temperature, such as a one or more diodes or an integrated circuit temperature sensor. These can provide one or more of the advantages of robustness, small size, ability to integrate within the profile of small diameter tubing to facilitate installation of the apparatus, simplicity and cost effectiveness to manufacture, ability to provide a large number of sensor modules in a single tubing, and sufficiently stable, accurate and low drift temperature measurements useful for a range of applications.

In alternative embodiments, the temperature sensitivity of the temperature sensor modules 820 may be provided at least in part, or entirely, by resistance thermometers, such as platinum resistance thermometers provided in each temperature sensor module. The resistance of the resistance thermometer is dependent on temperature, and so the voltage drop measured across each resistance thermometer is indicative of the sensed temperature at the location of the temperature sensor modules. However, resistance thermometers are relatively bulky and do not lend themselves readily to miniaturisation and incorporation inside tubing. Further, they are relatively brittle, compared for example to semiconductor temperature sensors and diodes in particular, and so are not as rugged or able to withstand pressure shockwaves. Further still, unlike diodes where the selection of the diode can mitigate for the effects of the temperature sensitivity of the resistance of the wires, resistance thermometers, while accurate, will always be subject to the resistance effects of the wires, unless a four-wire configuration is used to cancel them out. However, in a small diameter tubing where the number of available wires is limited, a four-wire connecting arrangement leads to a reduction in the number of temperature sensor modules that can be installed.

In further alternative embodiments, the temperature sensitivity of the temperature sensor modules 820 may be provided at least in part, or entirely, by crystal oscillators, such as quartz crystals. The resonant frequency of the crystal oscillator varies with temperature, and so by measuring the resonant frequency of a crystal oscillator, a thermal characteristic of each temperature sensor module can be sensed. The frequency of oscillation of the crystal oscillator can be measured at the control module 130 by directly measuring the oscillating electrical signal in the connected wires of the matrix, or by comparing it with the resonant frequency of the common reference oscillator by superposition and measuring a beat frequency. Alternatively, the frequency of oscillation of the crystal oscillator may be encoded in the signal received at the control module in another way, such as by the signal duration, or the signal may digitally encode the sensed temperature. Crystal oscillators are not susceptible to noise of resistance effects of the matrix wiring and provide extremely accurate temperature measurements that are stable for a very long period of time, and give high inter-sensor accuracy particularly where a common reference is used, so they are particularly appropriate where the apparatus is to be provided in situ in the wellbore to monitor temperature extremely accurately over long periods. However, crystal oscillators are relatively fragile, and so require ruggedisation and do not lend themselves to deployment where the apparatus is required to withstand, for example, pressure shockwaves due to the ignition of shaped charges in guns in order to create perforations in the well casing.

Where appropriate, the voltage drop due to the resistivity of the wires and the temperature sensitivity thereof can be compensated for by calibration means configured to compensate for the resistance of wires in the lines that connect the temperature sensors to the measurement module (provided in the control module), and also for the temperature dependence of the resistivity of those wires. The calibration means is provided as part of the control module. The calibration means compensates for the wire resistance by determining the resistance characteristics of the wires or the individual circuits associated with each temperature sensor of the apparatus. This wire resistance characterisation can be performed first in a controlled test environment prior to deployment. The calibration means then compensates for that wire/circuit resistance to isolate the responsiveness of the electrical properties of the temperature sensors to temperature variations. Specifically, in embodiments, the calibration means is configured to achieve this resistance compensation by having, prior to use, measured the resistance of the wiring to each sensor at least 2 known temperatures to determine the resistance and temperature coefficient of the individual sensor wiring. These resistance and temperature coefficients of the individual sensor wiring are stored as calibration data in the calibration means. In use, the calibration means is configured to use the prior calibration data and the known temperature of segments of the wire to calculate the resistance of the wiring to a sensor at a point in time.

Figure 7:
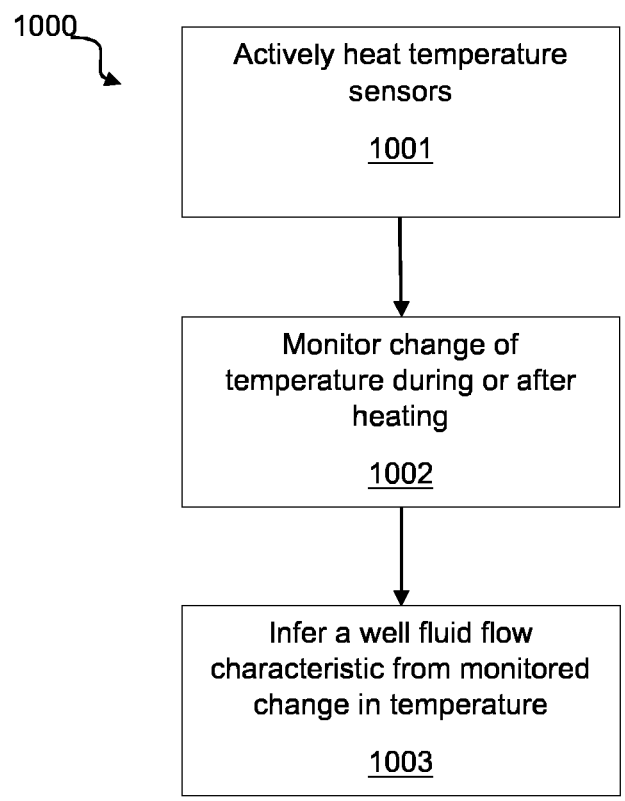
FIG. 7 is a process flow diagram showing a method of operation of apparatus described above in relation to FIGS. 1-6 to determine a temperature along a wellbore.

A method 1000 of operation of apparatus described above in relation to FIGS. 1-6 to determine a temperature along a wellbore will now be described with reference to FIG. 7.

Firstly, in step 1001 the temperature sensors in the tubing is actively heated by applying a current through a resistor arranged adjacent the temperature sensor or by using the resistance associated with the temperature sensor module itself, or by self-heating the sensors by applying a current therethrough. For example, a high current load could be applied to semiconductor temperature sensors to heat them. Alternatively, the temperature sensors could be actively cooled, for example, by use of one or more peltier devices, or cooling lines and a heat exchanger.

Then, in step 1002, a change of temperature of the or each sensor is monitored during and/or after heating.

Then, to translate a measured temperature in 1002 into information on the fluid (such as flow rate, an indication of the type of fluid components, etc), in step 1003, a fluid flow characteristic of the environment to which the tubing is exposed at the locations of the temperature sensors is inferred based on the change of temperature, or on a rate of change of temperature, or the power to create a change in temperature of the sensors during and/or after heating. An indication of the type of fluid components (e.g. gas/oil/water) to which the apparatus 100 is exposed is achievable as the specific heat capacity, thermal conductivity and density of the different fluids lead to differing thermal response when the sensors are heated.

The invention claimed is:

1. A wellbore temperature sensing apparatus for use in sensing temperature along a wellbore, the apparatus comprising:
    tubing being metallic tubing, comprising a plurality of temperature sensor modules provided at locations along the inside of the tubing, having electrical properties that vary with temperature; and
    an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group;
    wherein the temperature sensor modules comprise temperature sensors provided at least in part by at least one semiconductor element having electrical properties that vary with temperature and, optionally, wherein the apparatus is configured to use only the temperature sensitivity of at least one temperature sensitive semiconductor element of each temperature sensor module to infer a temperature of the temperature sensor module.

2. Apparatus as claimed in claim 1, wherein the at least one semiconductor element is a diode.

3. Apparatus as claimed in claim 2, wherein the diode is selected from at least one of: constant current diodes; constant voltage diodes.

4. Apparatus as claimed in claim 1, wherein at least one temperature sensor module comprises a single passive electronic component.

5. Apparatus as claimed in claim 1, wherein the temperature sensor modules each comprise a diode arranged to block current from flowing back through the temperature sensor modules in the matrix, and wherein the blocking diode is a low reverse current leakage diode, optionally having a reverse current leakage of less than 50 nA at the operational voltage of the apparatus and at a temperature of 25 degrees Celsius, and wherein the low reverse current leakage diode provides the temperature sensitivity of each temperature sensor module.

6. Apparatus as claimed in claim 1, wherein at least one temperature sensor module comprises a single electronic component.

7. Apparatus as claimed in claim 6, wherein the maximum physical extent of the single electronic component in any axis is less than 7 mm.

8. A wellbore temperature sensing apparatus for use in sensing temperature along a wellbore, the apparatus comprising:
   tubing being metallic tubing, comprising a plurality of temperature sensor modules provided at locations along the inside of the tubing, having electrical properties that vary with temperature; and
   an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group;
   wherein the temperature sensor modules comprise temperature sensors that are configured as silicon bandgap temperature sensors each having two p-n junctions that, in use, are operated at different current densities to infer a temperature by determining a voltage difference between the two p-n junctions at the different current densities, which is proportional to absolute temperature.

9. Apparatus as claimed in claim 8, wherein at least one temperature sensor module comprises a single electronic component.

10. Apparatus as claimed in claim 9, wherein the maximum physical extent of the single electronic component in any axis is less than 7 mm.

11. A wellbore temperature sensing apparatus for use in sensing temperature along a wellbore, the apparatus comprising:
   tubing being metallic tubing, comprising a plurality of temperature sensor modules provided at locations along the inside of the tubing, having electrical properties that vary with temperature; and
   an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group;
   wherein the temperature sensor modules each comprise a diode arranged to block current from flowing back through the temperature sensor modules in the matrix and, optionally, wherein the blocking diode is a low reverse current leakage diode, optionally having a reverse current leakage of less than 50 nA at the operational voltage of the apparatus and at a temperature of 25 degrees Celsius.

12. A wellbore temperature sensing apparatus for use in sensing temperature along a wellbore, the apparatus comprising:
   tubing being metallic tubing, comprising a plurality of temperature sensor modules provided at locations along the inside of the tubing, having electrical properties that vary with temperature; and
   an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group;
   further comprising a control module electrically connected to multiple temperature sensor modules, via the electrical network, and configured to, in use, periodically switch through combinations of pairs of wires to electrically connect and infer a temperature at each of the temperature sensors, and wherein the control module comprises at least one relay arranged to, in use, to switch through the combinations of pairs of wires, wherein the relays are optionally one of electromechanical relays and semiconductor switches.

13. Apparatus as claimed in claim 12, wherein the control module is configured to infer a thermal characteristic of each temperature sensor module based on the known sensitivity of at least one of the current in and the voltage across the temperature sensor to variations in temperature and by measuring variations in at least one of the current in and the voltage across the temperature sensor over time.

14. Apparatus as claimed in claim 12, further comprising a calibrator configured to compensate for the resistance of wires in the electrical network that connect the temperature sensor modules to the control module, and preferably also for the temperature dependence of the resistivity of those wires, wherein optionally the calibrator is provided as part of the control module.

15. Apparatus as claimed in claim 12, wherein the control module further comprises a common reference signal generator used to calibrate the measurement of one of the voltage and the current of each of the temperature sensor modules to changes in temperature.

16. Apparatus as claimed in claim 15, wherein the common reference signal generator is a reference voltage source.

17. Apparatus as claimed in claim 12, wherein the tubing is filled with and encapsulates a non-conducting liquid, optionally an oil, and optionally wherein the tubing comprises a pressure balancer, optionally including one of a bellows and a flexible bladder, configured to act to equalise internal pressure in the tubing with the ambient environment.

18. Apparatus as claimed in claim 12, wherein the tubing is one of a stainless steel, a duplex stainless steel, a super-duplex stainless steel, a nickel alloy, titanium and a titanium alloy.

19. Apparatus as claimed in claim 12, wherein the tubing outer diameter is in the range of 3 mm to 14 mm at the location in the tubing of at least one of the temperature sensor modules.

20. Apparatus as claimed in claim 12, wherein multiple control modules are provided, wherein individual control modules control sets of temperature sensor modules, and the control modules are linked to at least one master control module(s), and wherein optionally the apparatus further comprises communication equipment within the tubing to enable data communication along the tubing to one of enable communication between control modules, and to enable communication with other devices within the well.

21. Apparatus as claimed in claim 12, wherein the tubing containing the temperature sensor modules is arranged as at least one of a ring and a helix to extend around a tubular element of a well apparatus.

22. Apparatus as claimed in claim 12, further comprising a power source configured to provide operational power to the apparatus for sensing temperature in the wellbore in use, and wherein the power source is arranged to be provided as an in-well power source in use, wherein optionally the power source may be replaceable in the well.

23. Apparatus as claimed in claim 22, wherein the power source comprises at least one primary cell(s), secondary cell(s) and downhole power generator(s).

24. Apparatus as claimed in claim 12, wherein the apparatus is configured to be powered in use from a position higher in the well, optionally from surface, and optionally via at least one of inductive and capacitive coupling.

25. Apparatus as claimed in claim 12, further comprising a wireless data communication module coupled to the apparatus for use in sensing temperature in a wellbore and arranged to, in use:
wirelessly transmit along the well signals indicative of a temperature sensed in the wellbore by the apparatus, optionally using at least one of relays and repeaters; and optionally wirelessly receive control signals for controlling the operation of the apparatus, optionally for at least one of control of data acquisition, data transmission, and to control one of heating and cooling of the sensors, and wherein the wireless data communication module is configured to transmit said signals at least one of acoustically and electromagnetically.

26. A well comprising a wellbore temperature sensing apparatus having apparatus for use in sensing temperature in a wellbore as claimed in claim 12 arranged to sense a temperature in a wellbore of the well.

27. A well as claimed in claim 26, wherein the well apparatus comprises a tubular element and an annular sealing device provided at least 100 m below a surface of the well, and between one of the wellbore and a casing of the wellbore, and a tubular.

28. A well as claimed in claim 27, wherein the apparatus for use in sensing temperature in a wellbore is provided entirely below the annular sealing device.

29. A well as claimed in claim 27, wherein the tubing of the apparatus for use in sensing temperature in a wellbore does not extend across the annular sealing device.

30. A well as claimed in claim 26, wherein the well apparatus comprises a tubular element and wherein the tubing of the apparatus for use in sensing temperature in a wellbore extends at least one of along and around the tubular element.

31. A well as claimed in claim 30, wherein the tubular element in the well is a drill string, and wherein the drill string comprises one of a drill bit and a mill.

32. A well as claimed in claim 30, wherein the tubing is clamped to the tubular element in the well.

33. A well as claimed in claim 26, wherein the apparatus is deployed in the well on one of wireline, and coiled tubing, and optionally at least one of set and suspended in the well.

34. A well as claimed in claim 26, wherein the apparatus is configured to monitor the temperature at a barrier in the well.

35. A well as claimed in claim 26, wherein the apparatus is configured to monitor the well during a well test and a drill stem test.

36. A well as claimed in claim 26, wherein the well is at least one of a production and injection well.

37. A well as claimed in claim 26, wherein the apparatus is configured to monitor an exothermic reaction associated with a fluid treatment of the well.

38. A method of operation of apparatus as claimed in claim 12 to determine a thermal characteristic of a temperature sensor thereof, the method comprising:
one of actively heating and cooling at least one of the temperature sensors in the tubing; and
monitoring a change of temperature of the at least one sensor during and/or after one of heating and cooling.

39. A method as claimed in claim 38, further comprising, based on one of the change of temperature, the rate of change of temperature, and the power to create a change temperature of a sensor during and/or after one of heating and cooling, inferring a temperature or a fluid characteristic of the environment to which the tubing is exposed at the location of that temperature sensor.

40. A method as claimed in claim 38, wherein actively heating at least one of the temperature sensors in the tubing comprises self-heating the sensors by applying a current therethrough.

41. A method as claimed in claim 38, wherein at least one temperature sensor of the apparatus is heated by applying a current through a resistor or resistance associated with the temperature sensor module.

42. Apparatus as claimed in claim 12, wherein at least one temperature sensor module comprises a single electronic component.

43. Apparatus as claimed in claim 42, wherein the maximum physical extent of the single electronic component in any axis is less than 7 mm.

44. Apparatus as claimed in claim 12, wherein at least one temperature sensor module comprises a single passive electronic component.

45. Apparatus as claimed in claim 12, wherein the temperature sensor modules each further comprise a resistance thermometer, wherein the apparatus is configured such that the temperature sensitivity of each resistance thermometer is used to infer a thermal characteristic of the environment to which the tubing is exposed at the location of that temperature sensor.

46. Apparatus as claimed in claim 12, wherein the tubing comprises a matrix of at least 10 wires.

47. Apparatus as claimed in claim 12, wherein the tubing comprises 6 temperature sensor modules along its length.

48. A well comprising a wellbore temperature sensing apparatus having apparatus for use in sensing temperature in a wellbore, the apparatus comprising:
   tubing being metallic tubing, comprising a plurality of temperature sensor modules provided at locations along the inside of the tubing, having electrical properties that vary with temperature; and
   an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group;
   the apparatus arranged to sense a temperature in a wellbore of the well;
   wherein the tubing is clamped to and extends across perforating guns.

49. A well as claimed in claim 48, wherein the apparatus is configured to monitor the firing of the perforating gun.

50. A well as claimed in claim 48, wherein at least one of the apparatus extend(s) across multiple guns, and multiple perforating guns are independently activatable.

51. A method of calibrating a wellbore temperature sensing apparatus, the method comprising:
   tubing being metallic tubing, comprising a plurality of temperature sensor modules provided at locations along the inside of the tubing, having electrical properties that vary with temperature; and
   an electrical network comprising a plurality of wires and said plurality of temperature sensor modules, wherein the plurality of wires and plurality of temperature sensor modules are configured as a matrix by which the plurality of wires comprises a first group of wires and a second, different group of wires and each wire of the first group is electrically connected to each wire of the second group once, each electrical connection being by a respective temperature sensor module of the plurality of temperature sensor modules, such that each temperature sensor module can be individually electrically connected by a pair of wires comprising a first wire from the first group and a second wire from the second group, the method comprising:
   determining the resistance characteristics of the individual circuits associated with each temperature sensor of the apparatus, and
   compensating for that circuit resistance to isolate the responsiveness of the electrical properties of the temperature sensors to temperature variations.

\* \* \* \* \*